United States Patent
Nakao

(10) Patent No.: US 7,962,554 B2
(45) Date of Patent: Jun. 14, 2011

(54) E-MAIL MANAGEMENT SYSTEM, MAIL SERVER, FORWARDING METHOD AND MEDIUM

(75) Inventor: Hisayasu Nakao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1578 days.

(21) Appl. No.: 10/656,194

(22) Filed: Sep. 8, 2003

(65) Prior Publication Data

US 2004/0049548 A1    Mar. 11, 2004

Related U.S. Application Data

(63) Continuation of application No. PCT/JP01/01832, filed on Mar. 8, 2001, now abandoned.

(51) Int. Cl.
*G06F 15/16* (2006.01)
(52) U.S. Cl. .......... 709/206; 709/205
(58) Field of Classification Search .......... 709/204–207, 709/220, 223
See application file for complete search history.

(56) References Cited

U.S. PATENT DOCUMENTS

| | | | | |
|---|---|---|---|---|
| 5,732,137 A * | 3/1998 | Aziz | | 713/155 |
| 5,938,725 A * | 8/1999 | Hara | | 709/206 |
| 6,137,597 A | 10/2000 | Kanaya | | |
| 6,374,246 B1 * | 4/2002 | Matsuo | | 707/10 |
| 6,457,044 B1 * | 9/2002 | IwaZaki | | 709/206 |
| 6,557,045 B1 * | 4/2003 | Tsukui et al. | | 709/245 |
| 6,775,691 B1 * | 8/2004 | Kubik et al. | | 709/206 |
| 6,978,248 B1 * | 12/2005 | Walker et al. | | 705/10 |
| 7,016,940 B2 * | 3/2006 | Matsuda et al. | | 709/206 |
| 7,249,175 B1 * | 7/2007 | Donaldson | | 709/225 |
| 7,252,198 B2 * | 8/2007 | Togawa et al. | | 209/206 |
| 7,269,624 B1 * | 9/2007 | Malik | | 709/206 |
| 7,757,288 B1 * | 7/2010 | Khalsa | | 726/24 |
| 2002/0169835 A1 * | 11/2002 | Paul et al. | | 709/206 |
| 2003/0120733 A1 * | 6/2003 | Forman | | 709/206 |
| 2005/0198173 A1 * | 9/2005 | Evans | | 709/206 |

FOREIGN PATENT DOCUMENTS

| | | |
|---|---|---|
| JP | 06-046086 | 2/1994 |
| JP | 3036604 | 2/1997 |
| JP | 9-200256 | 7/1997 |
| JP | 09-321794 | 12/1997 |
| JP | 10-173936 | 6/1998 |
| JP | 11-004250 | 1/1999 |
| JP | 11-168496 | 6/1999 |
| JP | 11-187066 | 7/1999 |
| JP | 11-331243 | 11/1999 |

(Continued)

OTHER PUBLICATIONS

International Search Report.

(Continued)

*Primary Examiner* — Faruk Hamza
(74) *Attorney, Agent, or Firm* — Staas & Halsey LLP

(57) ABSTRACT

The invention provides a technique of automatically checking the validation of a destination address to which electronic mail is to be transferred. If the destination address is validated, the transfer of the mail to the address is permitted, so that no mail is transferred to the wrong address. An electronic mail management device (1, 2) for managing the destination addresses to which electronic mail is to be transferred comprises: means for receiving a request to set a destination address corresponding to a receiving mail address, and means for checking the validity of the destination address.

41 Claims, 20 Drawing Sheets

FOREIGN PATENT DOCUMENTS

| | | |
|---|---|---|
| JP | 2000-194618 | 7/2000 |
| JP | 2002-51071 | 2/2002 |
| JP | 2002-185492 | 6/2002 |

OTHER PUBLICATIONS

International Preliminary Examination.

"A Forest of Beech Trees, i-mode, cdmaOne/WAP, Dial Telephone, etc., Being absorbed in E-mail with a mobile telephone/PHS, PC, Work!", Kabushiki Kaisha Mainichi Communications, Aug. 18, 1999, vol. 6, No. 8, pp. 99-105.

Japanese Office Action dated Jun. 9, 2009 and issued in corresponding Japanese Patent Application 2002-572013.

Notice of Reason for Rejection mailed Mar. 15, 2011 for corresponding Japanese Application No. 2009-185996.

* cited by examiner

FIG.4

```
⊕ FORWARD SETTING STEPS                                    _ ▢ ×
FILE(F)  EDIT(E)  DISPLAY(V)  JUMP(G) COMMUNICATOR(C)  HELP(H)
  ↩      ↪     ↻       ⌂      🔍      📖     🖨     🔒      🛒     ⛔
RETURN  NEXT  REREADING  HOME  SEARCH  GUIDE  PRINT  SECURITY  SHOP  STOP
📑BOOKMARK 📙 JUMP  [http://www.local.ff.co.jp/mail/forward/method-forward.html]
```

OFF-OFFICE FORWARD SETTING STEPS
───────────────────────────────────────────────
1. WHEN INPUTTING FORWARD DESTINATION ADDRESS IN THE FOLLOWING FORM,
   TEST MAIL IS AUTOMATICALLY SENT FROM MAIL SERVER
2. SEND MAIL FROM IN-OFFICE MAIL ADDRESS IN FORMAT DESCRIBED HEREIN.
   KEYOWARD 1 IS eqwqw1qe4e3w231e31dsd121. KEYWOARD 2 IS DESCRIBED
   IN ABOVE TEST MAIL
     ADDRESS: forward-append@ff.co.jp
     SENDER: xxxx@ff.co.jp
     TITLE: forward-append
     TEXT: REQUEST FOR PERMISSION OF FORWARD SETTING
     NAME: ○○　○○
     POSITION: ○○SECTION IN○○DIVISION
     FORWARD DESTINATION: xxx@nif.com
     REASON FOR FORWARDING: ○○○○
     KEYWORD 1: xxxxxxxxxxxxxxxxx             ～16
     KEYWORD 2: yyyyyyyyyyyyyyyyy
     LIMIT OF PERIOD: DECEMBER 31, 2001
       THE ABOVE IS THE FORMAT
3. FORWARD SETTING IS DONE HEREIN                                  17
───────────────────────────────────────────────
SENDING OF TEST MAIL MAIL SERVER: [pop.ff.co.jp ▽]   SELECT YOUR OWN'S MAIL SERVER ← 11
IN-OFFICE
MAIL ADDRESS: [user          ]   LEFT SIDE TO @ff.co.jp  ← 12A
              EX.: shiba.h-nakao (INPUT IN HALF-POINT CHARACTERS)
FORWARD
DESTINATION
(OFF-OFFICE)  [zzz@xxx.com   ]   (INPUT IN HALF-POINT CHARACTERS)
MAIL ADDRESS:                    -- EX xxx@nif.com       ← 14A

[ SEND ]   [ CANCEL ]

FIG.5

ADDRESSED TO FORWARD DESTINATION zzz@xxx.com FRPM WEB SERVER

TITLE: mail test

TEXT: fdsfjfdaf4a4sgg3da2df2g1agag1f2gf1af12 <--- KEYWORD 2

20010320 <--- LIMIT OF PERIOD OF FORWARD DESTINATION ADDRESS

FIG.6

ADDRESSED TO RECEIPT ADDRESS fwcheck@ff.co.jp OF RECEIPT MAIL SERVER FROM WEB SERVER TITLE: forward check SENDER: user@ff.co.jp TEXT: forward check list user@ff.co.jp      <--- MAIL ADDRESS OF USER zzz@xxx.com      <--- MAIL ADDRESS OF FORWARD DESTINATION fdsfjfdaf4a4sgg3da2df2g1agag1f2gf1af12      <--- KEYWORD 2

20010331 <--- EFFECTIVE PERIOD OF FORWARD DESTINATION ADDRESS

20010131      <--- REPLY EFFECTIVE PERIOD

FIG.7

ADDRESSED TO forward-append@ff.co.jp FROM USER user@ff.co.jp

TITLE: forward-append

TEXT: REQUEST FOR PERMISSION OF FORWARD SETTING
NAME: TARO YAMADA
POSITION: DEVELOPMENT SECTION IN OO DEVELOPMENT DIVISION

FORWARD DESTINATION: zzz@xxx.com

REASON FOR FORWARDING: FOR OOOO.

KEYWORD 1: eqwew1qe4e3w231e31dsd121

KEYWORD 2: fdsfjfdaf4a4sgg3da2df2g1agag1f2gf1af12

FORWARD DESTINATION ADDRESS EFFECTIVE PERIOD 20010331

FIG.8

```
name: user                                                    # USER NAME
xxx@nif.com OK dahdahhdashdsag4fds4df5fds4454fsd4f 20010228 # TEST PROVED
                                                               SUCCESSFUL
yyy@ppp.com NG dahdahhdashdsag4fds4df5fds4454fsd4f 20010630 # TEST PROVED
                                                               UNSUCCESSFUL
zzz@xxx.com WT fdsfjfdaf4a4sgg3da2df2g1agag1f2gf1af12 20010131 # WAITING FOR
                                                               MAIL
```

FIG.12

```
ADDRESSED TO fwset@ff.co.jp FROM USER

TITLE:forward-set

TEXT:set forward list aaa@ff.co.jp bbb@nif.com ccc@zzz.com

¥user
```

*FIG.13*

| NAME : USER | | # USER NAME |
|---|---|---|
| *@ff.co.jp | — | # ALL IN-OFFICE ADDRESSED MAILS ARE PERMITTED. NO LIMIT OF PERIOD. |
| bbb@nif.com | PERMITTED TILL 20010630 | #2001/6/30 |
| ccc@zzz.com | PERMITTED TILL 20010131 | #2001/1/31 |

FIG.14

ADDRESSED TO USER user@ff.co.jp FROM MAIL SERVER

TITLE:

TEXT: 13:00, DECEMBER 11, 2002

FORWARD SETTING FILE OF USER"user ESQ"
WAS CHANGED AS FOLLOWS:

aaa@ff.co.jp bbb@nif.com ccc@zzz.com

¥user

FIG. 15

ADDRESSED TO fwget@ff.co.jp FROM USER "user"

TITLE:forward-set

TEXT:get-forward-list user@ff.co.jp

E-MAIL MANAGEMENT SYSTEM, MAIL SERVER, FORWARDING METHOD AND MEDIUM

This is a continuation of Application PCT/JP01/01832, filed on Mar. 8, 2001, now abandoned.

BACKGROUND OF THE INVENTION

1. Technical Field

The present invention relates to a technology for forwarding an E-mail.

2. Background Arts

An E-mail system has hitherto provided a forward service for forwarding a received E-mail addressed to a predetermined address. For utilizing this service, a user registers beforehand a forward destination address corresponding to a self-receipt address in a mail server.

Then, the mail server, when receiving the E-mail addressed to this receipt address, forwards this E-mail to the aforementioned forward destination. This scheme enabled the user, when changing the E-mail address, to separately use both of addresses before and after the address change and to forward the E-mail to an E-mail address used in home from an E-mail address used in a workplace.

Thus, a forward function and a forward service of the E-mail were convenient. It was, however, difficult to confirm from only address information whether the forward destination address is valid or not. In order to check validity of the forward destination address, there has hitherto been no alternative but to judge whether the forward destination address exists in, e.g., a pre-registered list or not.

Moreover, if an erroneous mail delivery happens when forwarded to an off-office mail address from an in-office Intranet, there might be a case where enterprise confidential information leaks out. The conventional list checking method was hard to prevent the erroneous mail delivery.

Further, if the mail address changes, the method of referring to the already-registered address list was impossible of judging the validity of the mail address. Still further, once the forward destination address was registered, there was a case in which the unjustified forwarding continued even when the address thereafter became ineffective.

SUMMARY OF THE INVENTION

It is an object of the present invention, which was devised in view of the problems inherent in the prior arts, to provide a technology capable of automatically checking validity of a forward destination address of an E-mail. The present invention aims at preventing an erroneous delivery of a forwarding mail in a way that permits forwarding to the forward destination address with its validity confirmed.

The present invention further aims at preventing the E-mail from being forwarded without a limit of period to the forward destination address that has once become effective.

To accomplish the above objects, the present invention adopted the following means.

An E-mail management system (1, 2) for managing a forward destination of an E-mail according to the present invention, comprises an accept unit accepting a setting request of a forward destination address corresponding to a receipt address of the E-mail, and a confirming unit confirming a validity of the forward destination address.

Preferably, the aforementioned E-mail management system may further comprise a sending unit sending a test mail to the forward destination address, and a receiving unit receiving a response to the test mail, wherein the confirming unit may command the sending unit to send the test mail and confirms a response via the receiving unit.

Preferably, the aforementioned E-mail management system (1) may further comprise an communication unit communicating with a sending device (4) sending the test mail to the forward destination and a receiving device (2) receiving the response to the test mail, wherein the confirming unit may command the sending device (4) to send the test mail via the communication unit and may confirm a response received by the receiving device (2) via the communication unit.

Preferably, the aforementioned E-mail management system (1, 2) may further comprise a forward destination registering unit (5) registering the forward destination address if the confirmation proved successful, and a forward control unit (2) forwarding the E-mail, wherein the forward control unit (2), where the forward destination address corresponding to the receipt address is registered in the forward destination registering unit, may forward the received E-mail addressed to this receipt address to the forward destination address.

Preferably, the aforementioned E-mail management system may further comprise an communication unit communicating with a mail server (2) registering the forward destination address corresponding to the receipt address of the E-mail, and forwarding the received E-mail addressed to this receipt address to the forward destination, address, wherein the confirming unit may commands if the confirmation proved successful, the mail server (2) to register the forward destination address corresponding to the receipt address via the communication unit.

Preferably, the confirming unit may confirm whether or not the response is transmitted from the receipt address.

Preferably, the confirming unit may give a command of sending test mails respectively to the receipt address and the forward destination address, and may confirm responses to these two test mails.

Preferably, the forward destination registering unit (5) may register a forward destination address unconditionally in response to a request for setting the forward destination address that is within a predetermined range, and may register a forward destination address with respect to which the confirmation by the confirming unit proved successful in response to a request for setting the forward destination address that is beyond the predetermined range.

Preferably, the E-mail management system (1, 2) may further comprise a notifying unit notifying that a permission of forwarding to the forward destination address with respect to which the confirmation proved unsuccessful, can not be given.

Preferably, the confirming unit may confirm a validity of the already-registered forward destination address after a predetermined period of time has elapsed since the registration thereof, and the forward control unit (2) may suspend forwarding to the forward destination address till the confirmation proves successful after the elapse of the predetermined period of time.

Preferably, the communication unit may receive a request for confirming the already-registered forward destination address from the mail server, and the confirming unit may confirm the validity of this forward destination address.

Preferably, the E-mail management system may further comprise an information providing unit disclosing a step of the response to the test mail, to a user who is within a predetermined range, wherein the confirming unit may confirm whether or not the response conforms with the response step.

Preferably, the confirming unit may confirm whether the response contains a predetermined data string or not.

Further, an E-mail management system (1) according to the present invention, which cooperates with a mail server (2) registering a forward destination address corresponding to a receipt address of an E-mail and forwarding the received E-mail addressed to this receipt address to the forward destination address, comprises an accept unit accepting a setting request of a forward destination address corresponding to a receipt address of the E-mail, and a command unit giving a command of confirming a validity of the forward destination address.

Preferably, the E-mail management system may further comprise a sending unit sending a test mail to the forward destination, wherein the command unit may command the sending unit to send the test mail and may have a validity of the forward destination address confirmed by a response to the test mail, to the mail server from the receipt address.

Preferably, the E-mail management system (1) may further comprise an communication unit communicating with a sending device (4) sending the test mail to the forward destination, wherein the command unit may command the sending device (4) to send the test mail to the forward destination address via the communication unit and has the validity of the forward destination address confirmed by the response to the test mail, to the mail server (2) from the receipt address.

Preferably, the sending device (4) may be the mail server (2).

Preferably, the command unit may give a command of sending test mails respectively to the receipt address and the forward destination address, and may make the mail server confirm the validity of responses to these two test mails.

Preferably, the communication unit may receive a request for confirming the already-registered forward destination address from the mail server, and the command unit may give the command of confirming the validity of this forward destination address.

Preferably, the E-mail management system (1) may further comprise an information disclosure unit disclosing a step of the response to the test mail, to a user who is within a predetermined range.

Preferably, the accept unit may accept the setting request by receiving the E-mail in a predetermined format at a predetermined address.

Further, according to the present invention, a mail server (2) cooperating with an E-mail management system (1) accepting a request for setting a forward destination address corresponding to a receipt address of an E-mail, comprises a confirming unit confirming a validity of the forward destination address, and a forward destination registering unit (5, 8) registering the forward destination address corresponding to the receipt address of the E-mail, wherein the forward destination registering unit (5, 8) registers the forward destination address with its validity confirmed.

Preferably, the mail server (2) may further comprise a receiving unit receiving a response to the test mail sent to the forward destination, wherein the confirming unit may confirm the validity of the forward destination address by the response.

Preferably, the confirming unit may confirm whether the response is transmitted from the receipt address or not.

Preferably, the confirming unit may confirm whether the response contains a predetermined data string or not.

Moreover, an E-mail forward destination management method of managing a forward destination of an E-mail according to the present invention, comprises accepting (106, S11) a request for setting a forward destination address corresponding to a receipt address of an E-mail, and confirming (106, S23-S27) a validity of the forward destination address.

Further, according to the present invention, an E-mail forward destination management method of managing a forward destination of an E-mail in cooperation with a mail server registering a forward destination address corresponding to a receipt address of the E-mail and forwarding the received E-mail addressed to this receipt address to the forward destination address, comprises accepting (101, S11) a setting request of a forward destination address corresponding to a receipt address of the E-mail, and giving a command (102) of confirming a validity of the forward destination address.

Still further, according to the present invention, an E-mail forward destination management method of managing a forward destination of an E-mail in cooperation with an E-mail management system accepting a request for setting a forward destination address corresponding to a receipt address of the E-mail, comprises confirming (106, S21-S23, S25-S27) a validity of the forward destination address, registering (S24) the forward destination address, and forwarding, when the forward destination address corresponding to an address of the E-mail received is registered, the E-mail to this forward destination address.

Further, according to the present invention, there may be provided a program for having any one of the aforementioned functions actualized. Moreover, according to the present invention, there may be provided a readable-by-computer recording medium recorded with the program described above.

As explained above, according to the present invention, the E-mail forward function is capable of automatically checking the validity of the forward destination address. Then, according to the present invention, the forwarding to the forward destination address with its validity confirmed is permitted, and an erroneous delivery of the forwarding mail is prevented. Further, the present invention can prevent the E-mail from being forwarded to the forward destination address that has once become effective without a limit of period.

BRIEF DESCRIPTION OF THE DRAWINGS

FIG. 4 is a diagram showing a display screen that displays off-office forward setting steps of the receipt mail;

FIG. 5 is a diagram showing an example of a test mail sent to an off-office forward destination address zzz@xxx.com from a Web server 1;

FIG. 6 is a diagram showing an example of a formatted text C sent to a receipt mail server 2 from the Web server 1;

FIG. 7 is a diagram showing an example of a response mail sent by a user to the receipt mail server 2;

FIG. 8 is a diagram showing a data example of a forward checklist 5 held by the receipt mail server 2;

FIG. 12 is a diagram showing an example of an E-mail sent to the receipt mail server 2 from a user terminal 3 when a forward setting request is made;

FIG. 13 is a diagram showing an example of a forward permission list 6;

FIG. 14 is a diagram showing an example of the E-mail sent to the user terminal 3 when the forward setting request is approved;

FIG. 15 is a diagram showing an example of the E-mail set for obtaining contents of the present setting in a forward setting file 8;

DETAILED DESCRIPTION OF THE PREFERRED EMBODIMENTS

Embodiments of the present invention will hereinafter be described with reference to the drawings.

<<First Embodiment>>

An E-mail management system according to a first embodiment of the present invention will hereinafter be explained in conjunction with FIGS. 1 through 10.

<System Architecture>

Figure 1:
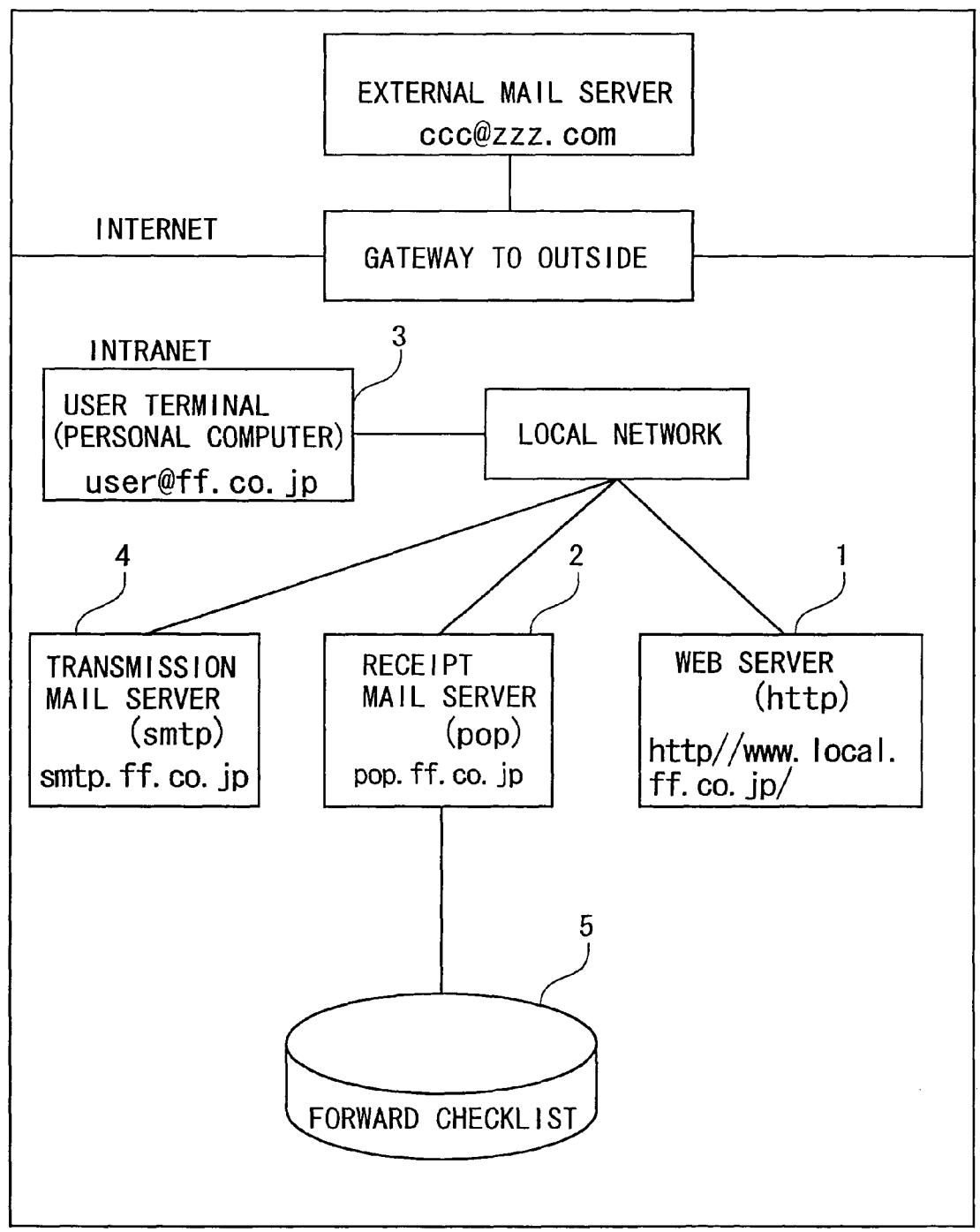
FIG. 1 is a diagram showing a system architecture of an E-mail management system in a first embodiment of the present invention.

FIG. 1 is a diagram of a system architecture of this E-mail management system. This E-mail management system includes a user terminal 3 that transmits and receives mails, a transmission mail server 4 for managing transmissions of the mails, a receipt mail server 2 for managing receipts of the mails, and a Web server 1 for accepting settings related the mail management.

The user terminals 3 and the respective servers configure an Intranet through a local area network (which will hereinafter be abbreviated to LAN). This Intranet is connected to an external mail server on the Internet via a gateway to the outside.

The user terminal 3 is, for example, a personal computer (which will hereinafter be abbreviated to PC). The user terminal 3 provides the user with functions of accessing the Web server, accessing the Internet, and creating, transmitting, receiving and displaying the mail and so forth. In FIG. 1, the user terminal 3 is assigned a mail address such as user@ff.co.jp.

The transmission mail server 4 is a so-called server device and includes an unillustrated CPU, memory, hard disk, LAN board, etc. The transmission mail server 4 is connected via the LAN board to the LAN, and manages the transmissions of the E-mails (the LAN board corresponds to an communication unit).

The E-mail to be transmitted is forwarded based on SMTP (Simple Mail Forward Protocol) via the LAN to the transmission mail server 4 from the user terminal 3, and is forwarded to the mail server as a recipient. In FIG. 1, the transmission mail server 4 is assigned a domain name such as smtp.ff.co.jp.

The receipt mail server 2 is a so-called server device and includes an unillustrated CPU, memory, hard disk, LAN board, etc. The receipt mail server 2 is connected via the LAN board to the LAN, and manages the receipts of the E-mails (the LAN board corresponds to an communication unit).

The E-mail received is read based on POP (Post Office Protocol) to the user terminal 3. In FIG. 1, the receipt mail server 2 is assigned a domain name such as pop.ff.co.jp.

This receipt mail server 2 provides a mail forward function of forwarding the delivered user-addressed mail to other mail address designated by the user (the CPU of the receipt mail server 2 providing this function corresponds to a forward control unit).

Therefore, the receipt mail server 2 has a forward destination checklist 5 contained in a file within the unillustrated hard disk. The forward destination checklist 5 is a file in which a mapping between a receipt address of the E-mail and a forward destination address of the received E-mail addressed to the receipt address, is defined.

Further, the receipt mail server 2 receives from the user terminal 3 a reply to a test mail sent to its forward destination address (the CPU and the LAN board of the receipt mail server 2 providing this function correspond to a receipt unit). Then, the receipt mail server 2 judges a validity of the reply and stores the forward destination checklist 5 with a forward destination address of the reply judged to be valid (the CPU of the receipt mail server 2 providing this function corresponds to a confirming unit).

The Web server 1 is also a so-called server device and includes an unillustrated CPU, memory, hard disk, LAN board, etc. The Web server 1 is connected via the LAN board to the LAN (the LAN board corresponds to an communication unit). The Web server 1 provides based on HTTP (HyperText Forward Protocol) the user terminal 3 with a variety of setting screens and messages via the LAN.

For instance, the Web server 1 provides a Web page for utilizing the mail forward function. The user has this Web page displayed on the user terminal 3 and inputs or changes the forward destination address, etc.

Moreover, the Web server 1 sends a test mail for checking the validity of the mail address of the forward destination that is set in the Web page described above (the CPU and the LAN board of the Web server 1 providing this function correspond to a transmission unit). Further, the Web server 1 provides the user with information representing response steps for responding to the test mail. This item of information is described by HTML (HyperText Markup Language) and stored on the unillustrated hard disk (the CPU and the hard disk of the Web server 1 executing this process correspond to an information providing unit).

<Outline of Functions>

According to the present invention, the forward destination address is set on the Web page on the Web server 1. This Web server 1, when the forward destination address (e.g., a mail address, etc. within the same place of duty) permitting the forwarding unconditionally is applied for, enables the E-mail to be immediately forwarded to this forward destination address. Therefore, the Web server 1 notifies the receipt mail server 2 of this forward destination address.

When the user inputs a forward destination address, for instance, an off-office address that does not unconditionally permit the forwarding, the Web server 1 sends the test mail containing a predetermined keyword (which will hereinafter be referred to as a keyword 2).

Details of a method of replying to this test mail are described on the Web page provided by the same Web server 1. If the reply to a specified address meets predetermined requirements, the receipt mail server 2 admits that the forward destination address is valid. Then, the receipt mail server 2 validates this forward destination address and registers it in the forward destination checklist 5. Through this arrangement, the receipt mail server 2 permits the forwarding to that forward destination address.

Herein, the predetermined requirements are that the reply is sent from the predetermined mail address (such as the in-office mail address, etc.), that the reply is described in a formatted-text form displayed on the Web page, and that the reply contains a keyword 1 written on the Web page and the keyword 2 written in the test mail. Further, if the contents of the reply do not meet these conditions, the forwarding to that address is not permitted.

The receipt mail server 2 sets an effective period for the effective forward destination address and, after a fixed period of time, automatically resends the test mail. If a reply to this test mail meets the predetermined requirements, the receipt mail server 2 prolongs the effective period.

If there is no reply for the fixed period of time, however, or if that reply does not meet the predetermined requirements, the receipt mail server 2 deletes that forward destination address from the forward destination checklist 5. The forwarding to that forward destination address is thereby inhibited.

<Screen Layout>

Figure 2:
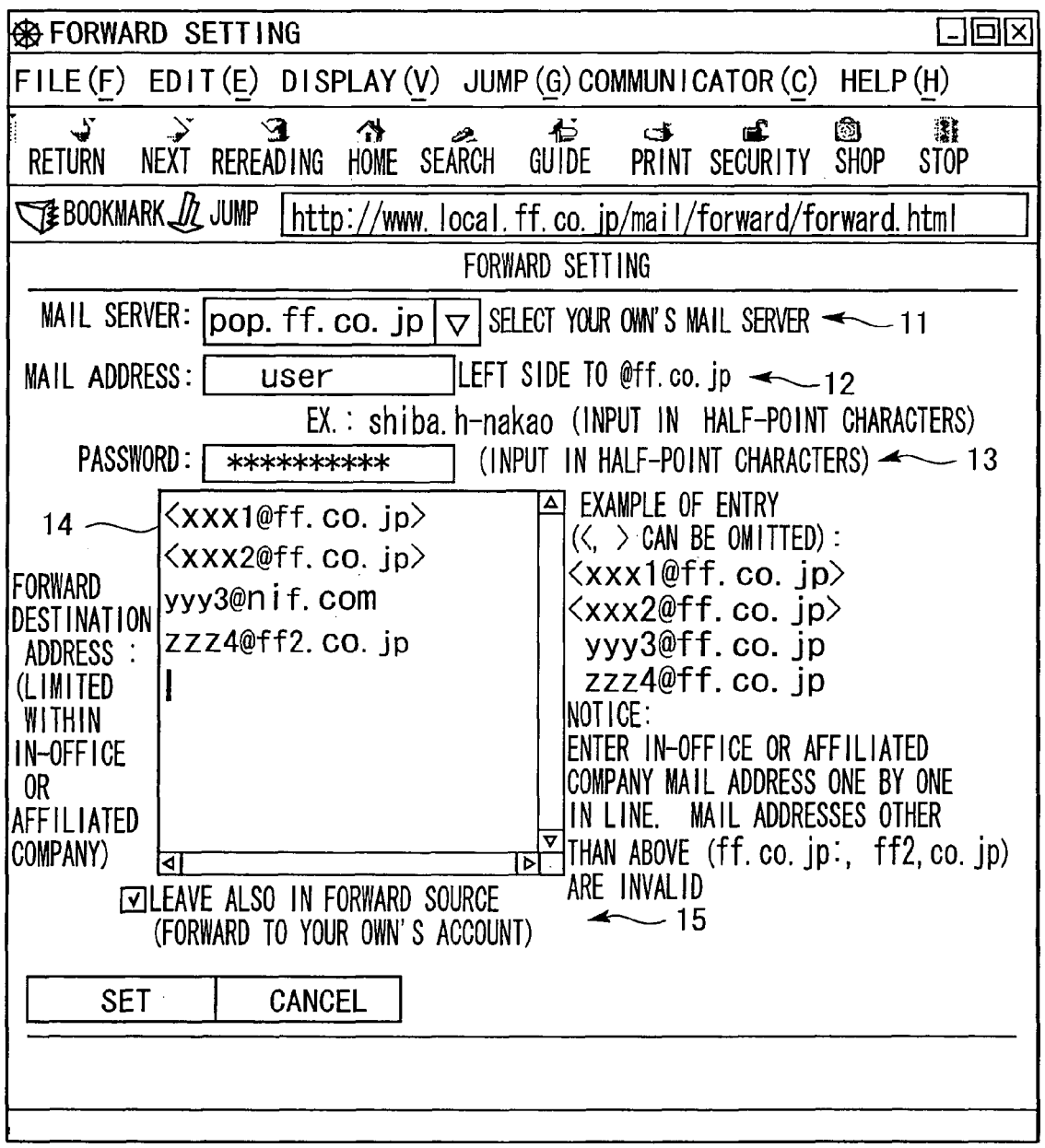
FIG. 2 is a diagram showing a setting screen utilized for receipt mail forward setting.
Figure 3:
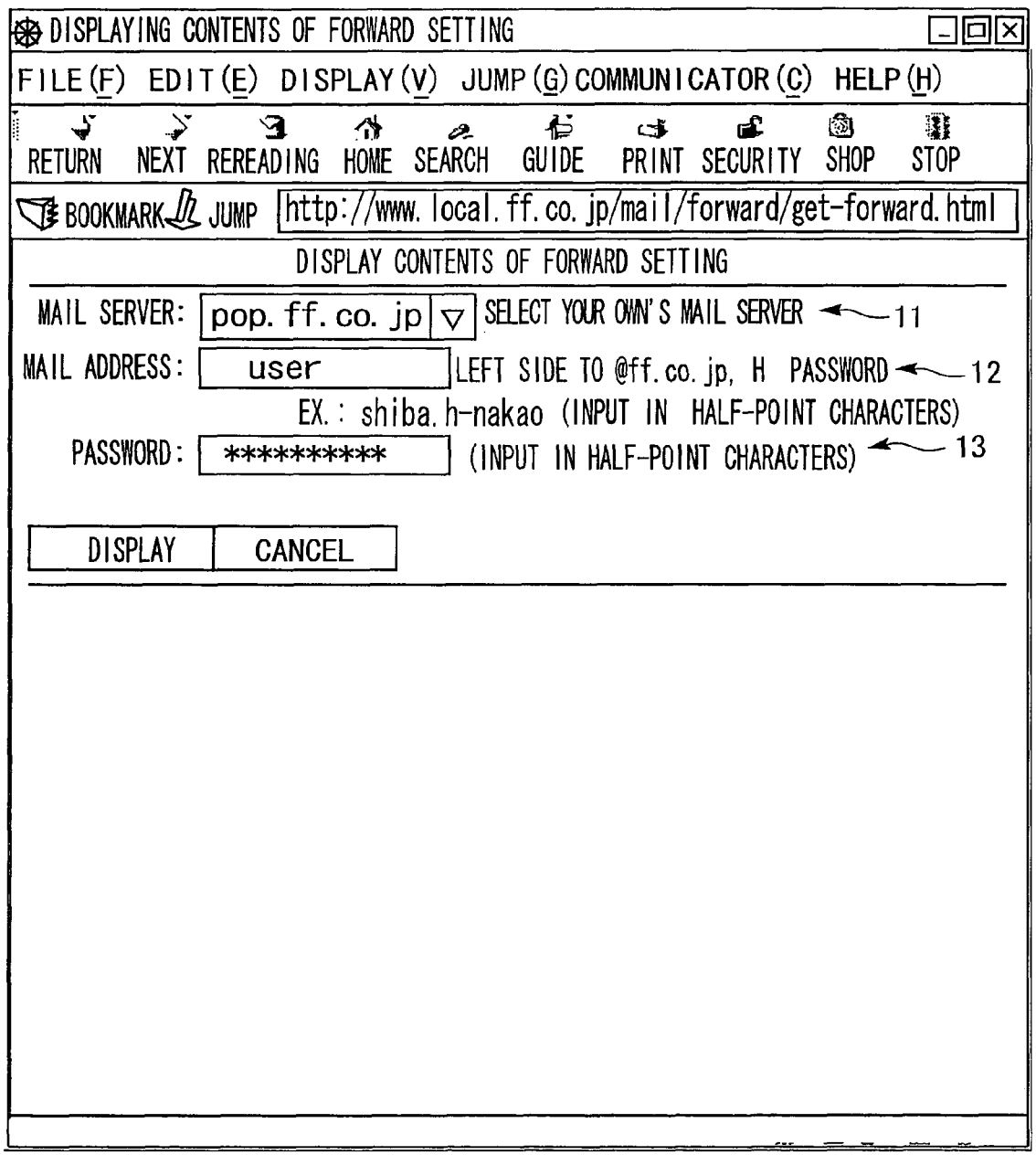
FIG. 3 is a diagram showing a display screen of contents of the forward setting.

FIGS. 2 through 4 show setting screens provided based on HTTP to the user terminal 3 from the Web server 1 (the CPU of the Web server 1 providing this function corresponds to an accepting unit). These screens are provided to the user terminal 3 from the Web server 1 in the Intranet.

Therefore, a host (a third party) on the Internet is unable to access these screens. FIG. 2 shows the setting screen used for setting a forward of the receipt mail to an in-office address or an affiliated company.

This screen contains a mail server designation box 11, a mail address designation box 12, a password designation box 13, a forward destination address designation box 14, a forward-to-the-source-of-forward designation box 15, a "set" button, and a "cancel" button.

The domain name of the receipt mail server 2 is designated in the mail server designation box 11. This receipt mail server 2 manages the mails to be forwarded. Referring to FIG. 2, the domain name "pop.ff.co.jp" is designated as the receipt mail server 2.

The user's receipt mail address is designated in the mail address designation box 12. This address is also called a forward source address. A user account (which is "user" in FIG. 2) excluding a domain "@ff.co.jp" is designated in the mail address designation box 12.

A password used when the user terminal 3 accesses the receipt mail server 2, is designated in the password designation box 13.

A forward destination address used for forwarding the received E-mail addressed to the forward source address, is designated in the forward destination address designation box 14. On the setting screen in FIG. 2, however, only the forwarding to the in-office address or the affiliated company is permitted. When putting a checkmark in the forward-to-the-forward-source designation box 15, the forward source itself is contained in the forward destination address.

After the settings described above, when the user presses the "set" button by use of an unillustrated pointing device on the user terminal 3, the contents set on this screen are set in the forward destination checklist 5 shown in FIG. 1. Further, when pressing the "cancel" button, the contents set on the screen in FIG. 2 are discarded.

FIG. 3 shows a screen for displaying the contents of the forward setting. This screen is utilized when displaying the contents of the forward destination address setting. This screen contains, as on the setting screen in FIG. 2, the mail server designation box 11, the mail address designation box 12 and the password designation box 13. Further, this screen contains a "display" button and the "cancel" button.

A domain name of the mail server that retains the contents of the forward setting is designated in the mail server designation box 11. Further, a mail address of the forward source is designated in the mail address designation box 12. Moreover, as in the case shown in FIG. 2, a password used when the user terminal 3 accesses the mail server is designated in the password designation box 13.

After the settings described above, when the user presses the "display" button, the setting contents of the forward destination address mapping to the forward source address designated in the mail address designation box 12 are displayed. Further, when the user presses the "cancel" button, the setting contents in FIG. 3 are discarded.

FIG. 4 shows a screen for displaying forward setting steps of forwarding the receipt mail to an off-office address.

This screen contains a description display area 16 and a test mail sending area 17. The description display area 16 displays a test mail sending request step for checking a validity of the forward destination, and a step for responding to the test mail.

The user, after reading the description in the description display area 16, makes a request for sending the test mail in the test mail sending area 17. The test mail sending area 17 contains a mail server designation box 11, an in-office mail address designation box 12A, a forward destination address designation box 14A, the "send" button and the "cancel" button.

As in the case shown in FIG. 2, the domain name of the receipt mail server 2 is designated in the mail server designation box 11. Further, as in the case of the mail address designation box 12 in FIG. 2, the forward source mail address is designated in the in-office mail address designation box 12A. Moreover, an off-office forward destination mail address is designated in the forward destination mail address designation box 14A.

After the settings described above, when the user presses the "send" button, the Web server 1 sends the test mail to the in-office E-mail address designated in the in-office mail address designation box 12A and to the forward destination address designated in the forward destination mail address designation box 14A.

At this time, the Web server 1 sends a formatted text C for making a request for the forward permission to the receipt mail server 2 designated in the mail server designation box 11 (the CPU of the Web server 1 executing this process corresponds to a command unit).

Upon receiving the formatted text C, the receipt mail server 2 adds the aforementioned forward destination address to the forward destination checklist 5 shown in FIG. 1. In this case, however, the forward destination address is set in a wait-for-confirmation status, wherein the received mail is not actually forwarded to that address.

The user, when receiving this test mail addressed to the in-office E-mail address and to the forward destination address, sends responses to the respective test mails in accordance with the steps in the description display area 16. When the mail server receives these two responses and confirms the validity thereof, the receipt mail server 2 sets, in a forward permission status, the forward destination address that has been set in the wait-for-confirmation status in the forward destination checklist 5. With this setting, the forward destination address becomes effective, and the receipt mail is forwarded to the forward destination address thereof.

<Data Structure>

FIG. 5 shows an example of the test mail sent to an off-office forward destination address "zzz@xxx.com" from the Web server 1. This test mail contains a title and a test.

In the test mail, the title is set such as "mail test". Further, a keyword 2 consisting of random numbers and a forward destination address effective period "20010320 (March 20th in the year of 2001) are described in the "text".

Note that an E-mail having the same contents as those of this test mail is sent to the normal in-office E-mail address (that is the E-mail address designated in the in-office mail address designation box 12A in FIG. 4).

FIG. 6 shows an example of a formatted text C sent to an accept address fwcheck@ff.co.jp of the receipt mail server 2 from the Web server 1. This E-mail is termed a forward permission request mail. The forward permission request mail contains a title, a sender and a text.

In the forward permission request mail, the title is set such as "forward check". An E-mail address of a user who utilizes the forward function is described in the "sender". Further, "a character string such as "forward checklist", an e-mail address of the user utilizing the forward function, a forward destination E-mail address, a keyword 2 consisting of the random numbers, a forward destination address effective period and a reply effective period, are described in the "text".

Herein, the forward destination address effective period is an effective period of the forward destination address, which is set within a predetermined allowable range by the user. On the other hand, the reply effective period is a reply effective period set based on a system parameter in the Web server 1. Even if the user replies to the test mail after this reply effective period, the mail forwarding is not permitted.

FIG. 7 shows an example of a response mail sent by the user to a response receipt address forward-append@ff.co.jp of the receipt mail server 2 from an E-mail address user@ff.co.jp.

The user, when receiving the test mail addressed to the normal in-office E-mail address (that is the E-mail address designated in the in-office mail address designation box 12A in FIG. 4) and to the forward destination address, sends a response mail to the test mail to the accept address forward-append@ff.co.jp of the receipt mail server 2. FIG. 7 shows an example of the response sent by the user from the normal in-office E-mail address.

This response mail contains a title, a text, a name, an assignment place, a forward destination, a reason for forwarding, a keyword1, a keyword2 and an effective period. A structure of such a response mail is clarified on an off-office forward setting step screen (FIG. 4) provided by the Web server 1.

In this response mail, the title is set such as forward-append@ff.co.jp. Further, "Give the permission of the forward setting" is described in the "text". The name is a name of the user who registered the forward destination address, and the assignment place is the place to which the user is assigned. The forward destination is an off-office forward destination mail address to which the received mail is forwarded.

Further, the keyword1 is what is set on the off-office forward setting step screen (FIG. 4) provided by the Web server 1. Moreover, the keyword 2 is what is designated in the "text" of the test mail sent to the forward destination address from the Web server 1. Further, the forward destination address effective period is an effective period for which the forwarding of the E-mail is permitted.

FIG. 8 shows an example of data of the forward destination checklist 5 held by the receipt mail server 2. This forward destination checklist 5 is set for every user receiving a service of the receipt mail server 2. The forward destination checklist 5 is such that a user name is designated in a first line. Further, designations of the forward destinations are listed up in second and consecutive lines.

Each line for the designation of the forward destination contains a forward destination address, a status, a keyword 2 and a forward effective period. Further, a comment is subsequent to a character "#" in each line. The status among these elements defines a status of availability of each forward destination address.

For instance, when the status is OK, this implies that an E-mail forward service to the forward destination address is being performed.

Moreover, when the status WT, this implies that the receipt mail server 2 receives the forward permission request mail from the Web server 1, and the forward destination address thereof is in the process of being checked by the test mail. Alternatively, the WT status may also imply that the effective period of the forward destination address expires, and the forward destination address thereof is in the process of being checked by the test mail.

Further, in the case of NG, this implies a status where the forward destination address thereof is unusable. This is the forward destination address of which a use suspension is designated by the user through an unillustrated user interface. Thus, the user can select and use a desired address among the plurality of forward destination addresses registered in the forward destination checklist 5, and can suspend the use of those other than selected address.

For example, in the second line of the forward destination checklist 5 shown in FIG. 8, a forward destination address xxx@nif.com is designated, and the status is OK. Accordingly, the user-addressed E-mail arrived at the present is forwarded to xxx@nif.com. The effective period of this forward destination address is set on Feb. 28, 2001.

Further, in the third line, a forward destination address yyy@ppp.com is designated, and the status is NG. Accordingly, the received E-mail is not forwarded to this forward destination address at the present.

Moreover, in the fourth line, a forward destination address zzz@xxx.com is designated, and the status is WT, i.e., the wait-for-confirmation status. Hence, when the response mail to the test mail with respect to this forward destination address is normally received, this forward destination address is used.

<Operation and Effect>

Figure 9:
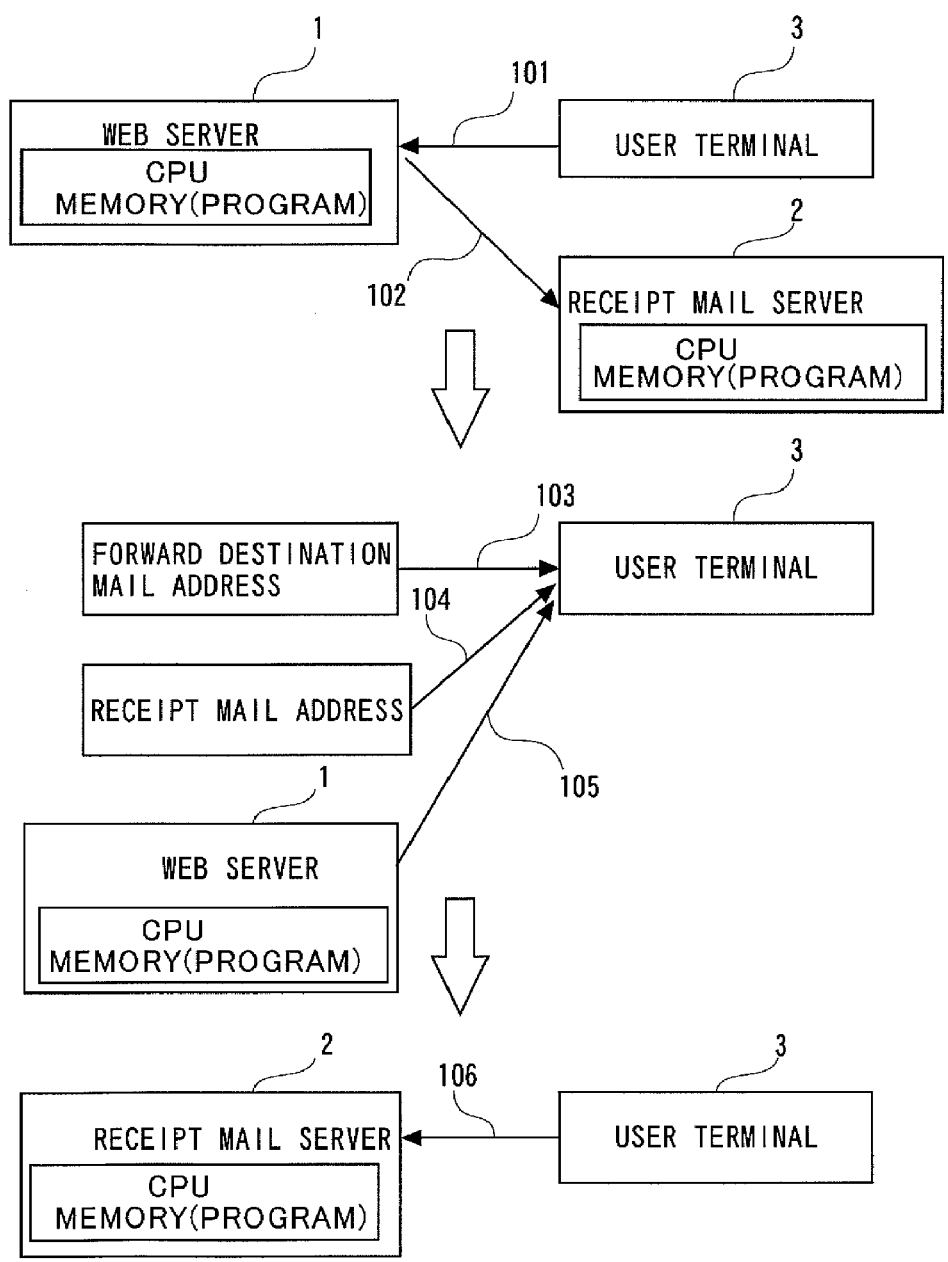
FIG. 9 is a flowchart showing forward destination address setting steps.
Figure 9A:
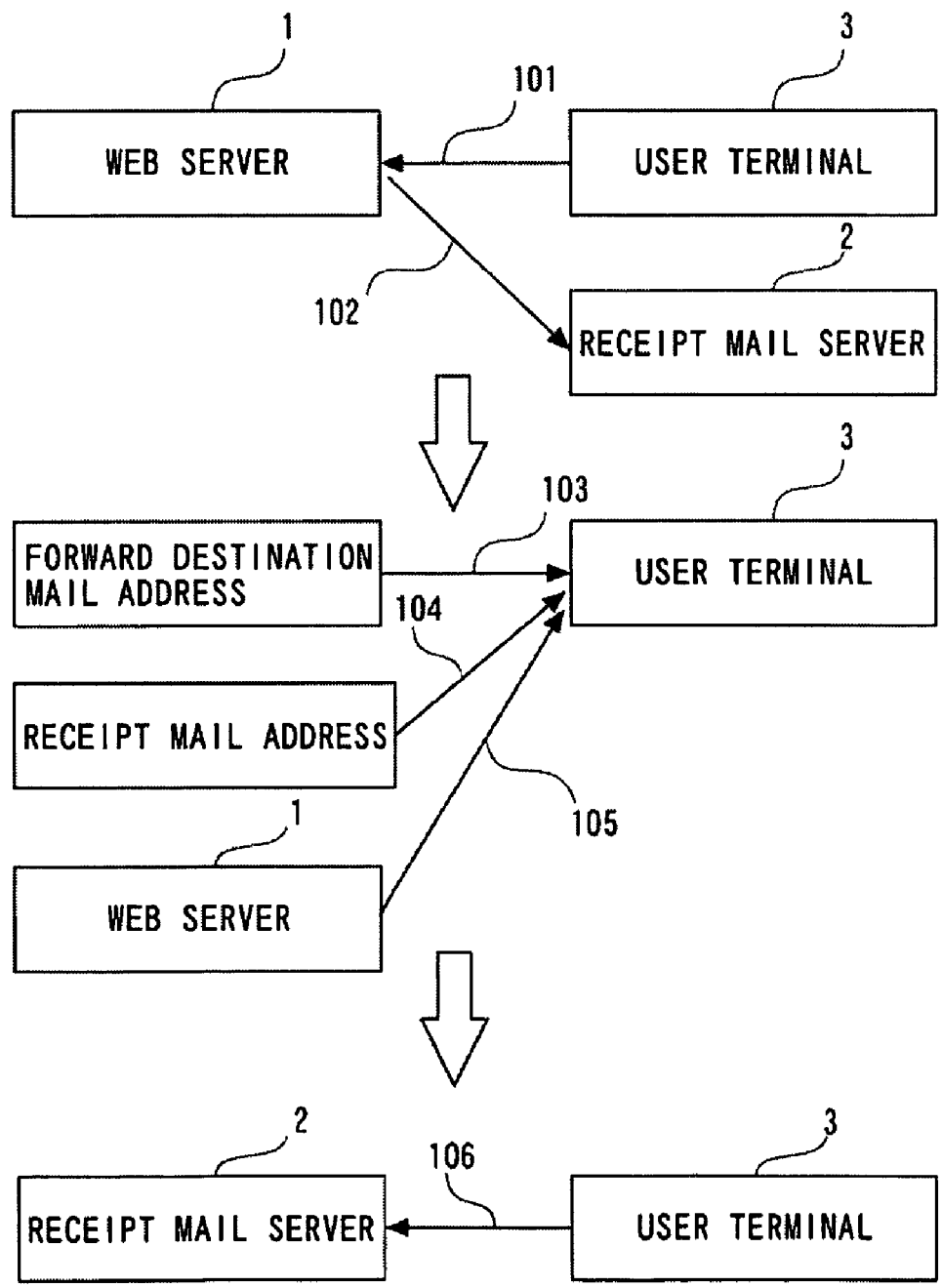
Figure 9B:
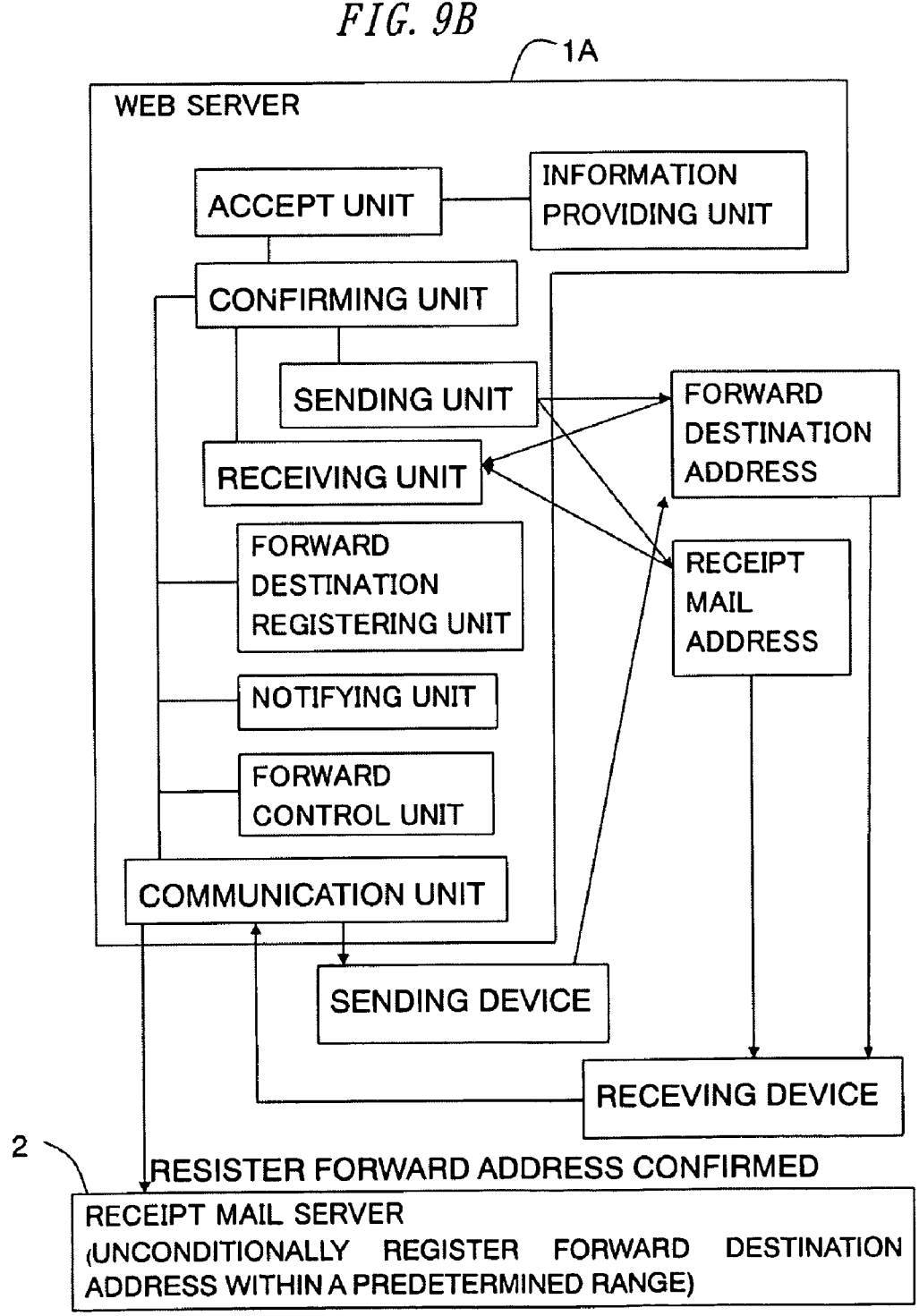
Figure 9C:
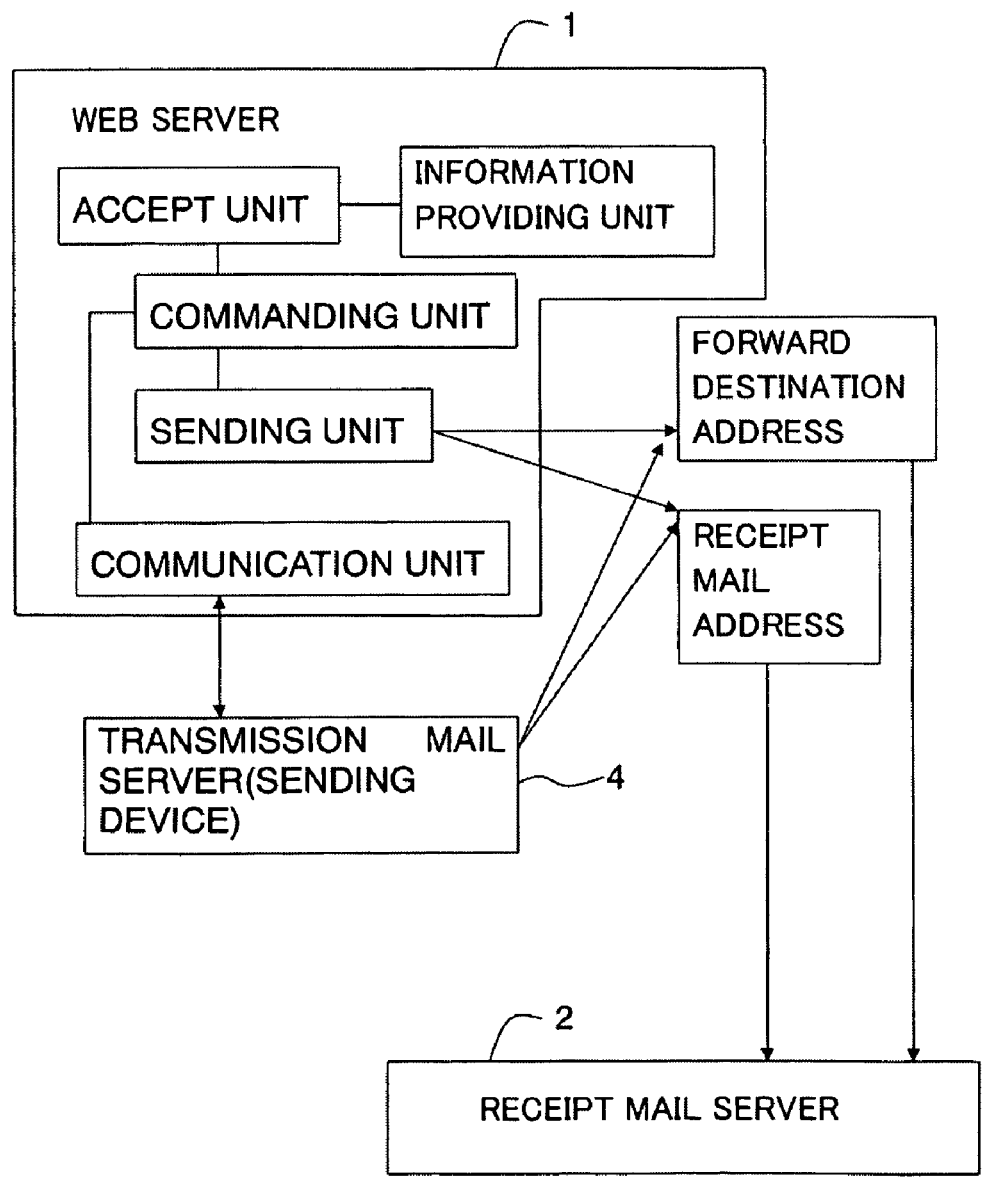

FIG. 9 shows forward destination address setting steps in the present E-mail management system. Now, the Web page of the Web server 1 is displayed on the user terminal 3 as the user operates.

The user terminal 3 receives inputs of a user name, a mail address, a forward destination address, etc. on this Web page. These inputs are transmitted via the LAN to the Web server 1 (an arrowhead 101).

If the forward destination address is within the allowable range, the Web server 1 immediately sends a setting file describing the forward destination address to the receipt mail server 2. Herein, the setting file is a file describing a name of the user making a request for the forward setting, a forward destination address thereof and a forward destination address effective period.

Whereas if the forward destination address is beyond the allowable range, the Web server 1 sends a test mail A containing the designated keyword 2 to the forward destination address. Further, the Web server 1 sends a test mail B containing the designated keyword 2 to the normal receipt mail address (the forward source mail address). Moreover, the Web server 1 embeds the forward destination information of the user in the form of the formatted text C and thus forwards the same information to the receipt mail server 2 (an arrowhead 102).

This formatted text C contains a normally-used mail address of the user, a forward destination address, a keyword 2, a forward destination address effective period and a reply effective period. The receipt mail server 2 saves the user's forward destination information an un-illustrated temporary file 7(Refer to the second embodiment).

Then, the test mail A sent as above is received by the user terminal 3 from the forward destination mail address (an arrowhead 103). Further, the test mail B is received by the user terminal 3 from the normal receipt mail address (an arrowhead 104). Note that the terminal receiving the these test mails A, B may not be the same.

A Web page reply step and a reply illustrative sentence D are displayed on the user terminal 3 (an arrowhead 105), and the user refers to the reply step and the reply illustrative sentence D. Further, this reply step explicitly contains the keyword 1 (see FIG. 4). With reference to the reply illustrative sentence D, the user adds the name, the assignment place and the keyword 1 to the contents of the received test mail A, thereby creating a reply mail X to the test mail A. Further, with reference to the reply illustrative sentence D, the user adds the name, the assignment place and the keyword 1 to the contents of the received test mail B, thereby creating a reply mail Y to the test mail B.

Then, the user sends, to the receipt mail server 2, the reply mails X and Y with the titles designated in the formatted text which is shown in the web page from the normal mail address (the forward source address) and the forward destination address (an arrowhead 106).

The receipt mail server 2 confirms whether or not the reply mails X and Y have been received within the reply effective periods. Then, when the reply mails X and Y have been received within the reply effective periods, the receipt mail server 2 confirms whether or not the keywords 1 are contained in the reply mails X and Y. Note that the keyword 1 is apiece of information set as a constant in the Web server 1 and in the receipt mail server 2.

If these reply mails contain the keywords 1, the receipt mail server 2 can confirm that the reply mails are based on the off-office forward setting step (FIG. 4). Such being the case, next, the receipt mail server 2 collates the reply mails X and Y with the formatted text C.

Then, if both of the reply mails X (containing the keyword 2) and Y (containing the keyword 2) are matched with the content of the formatted text C (containing the keyword 2), the receipt mail server 2 adds the forward destination address concerned to the forward destination checklist 5 in the OK-status.

Further, simultaneously, the receipt mail server 2 sets the effective period of that forward destination address in the forward destination checklist 5. Then, the receipt mail server 2 deletes the formatted text retained in the temporary file 7.

While on the other hand, if the keyword 1 is contained in the reply mail X or the reply mail Y in the step described above, these reply mails are each judged not to be a valid reply that conforms to the off-office forward setting step (FIG. 4).

Further, even if the reply mail X or Y contains the keyword 1, unless the reply mail X or Y is matched with the contents of the formatted text C (such as a case where the keyword 2 is not contained, and so on), the receipt mail server 2 judges this reply mail not to be the valid reply mail.

In these cases, the receipt mail server 2 does not set the forward destination address in the forward destination checklist 5. Then, the receipt mail server 2 deletes the formatted text C retained in the temporary file 7.

Figure 10:
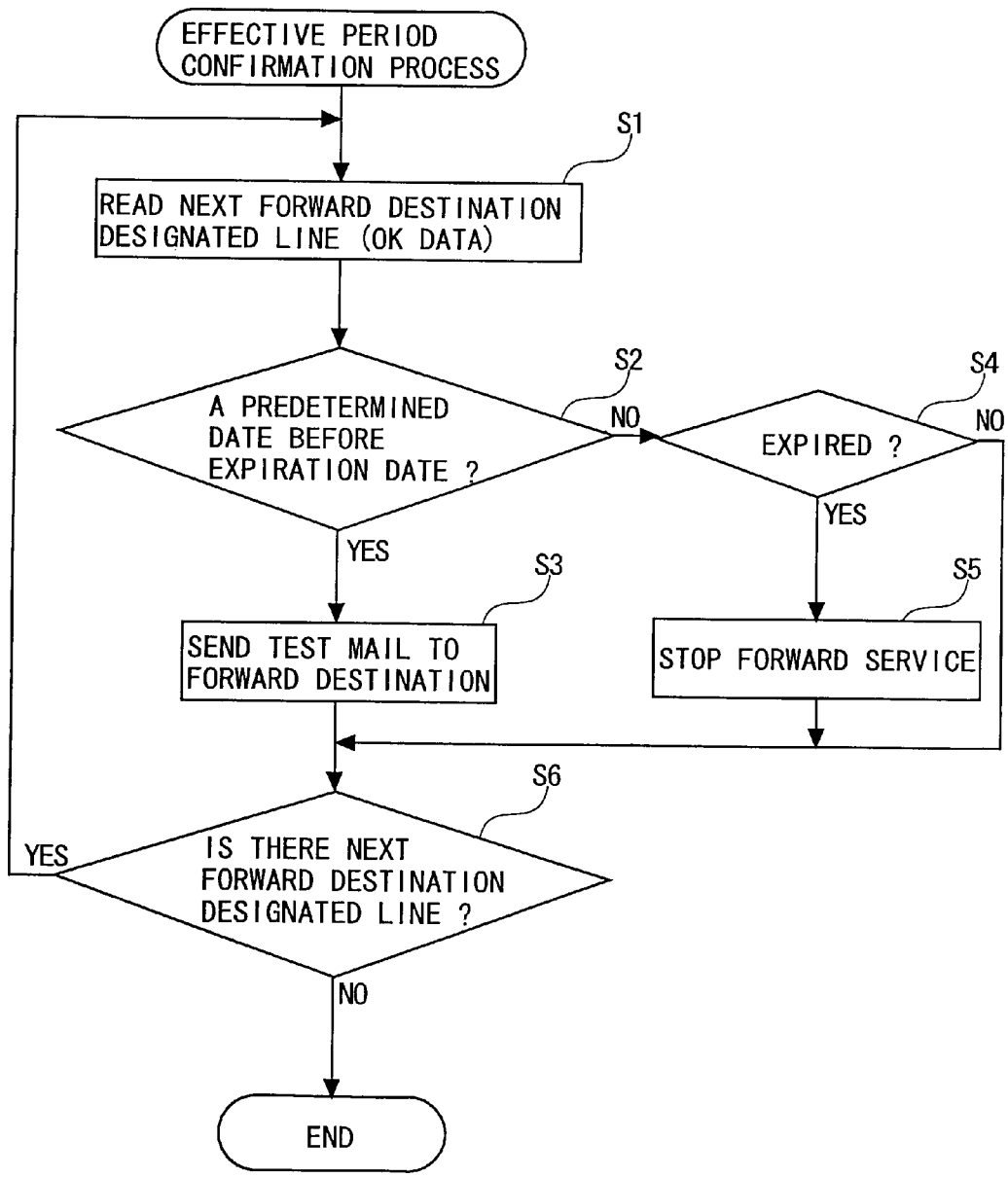
FIG. 10 is a flowchart showing an effective period confirmation process executed by the receipt mail server 2.

FIG. 10 shows an effective period check process executed by the receipt mail server 2. This process is periodically started up in the receipt mail server 2, thereby executing a management of the period of the forward destination address.

In this process, to begin with, the receipt mail server 2 reads a next forward destination designated line, where OK-status is designated, from the forward destination checklist 5 (S1). Subsequently, the receipt mail server 2 judges whether the forward effective period contained in that forward destination designated line is a predetermined date anterior to a expiration or not (S2).

If the forward effective period is a predetermined date anterior to the expiration, the receipt mail server 2 sends the test mail to the forward destination thereof (S3). Thereafter, the receipt mail server 2 advances the control to a judgment in S6. Note that a response to this test mail is processed in the same step as explained in FIG. 9.

Whereas if judged in S2 not to be anterior to the predetermined expiration date, the receipt mail server 2 judges, from whether the forward effective period elapses over the present date, whether this effective period expires or not (S4). Then, if it expires, the receipt mail server 2 deletes that forward destination designated line from the forward destination checklist 5.

With this processing, the receipt mail server 2 stops the forward service for that forward destination address (S5). Thereafter, the receipt mail server 2 makes the control proceed to a judgement in S6. Further, if it is judged in S4 that the effective period does not yet expire, the receipt mail server 2 skips over that forward destination designated line and advances the control to the judgement in S6.

Next, the receipt mail server 2 judges whether a next forward destination designated line exists in the forward destination checklist 5 (S6). If there is the next forward destination designated line, the receipt mail server 2 returns the control to S1. Whereas if next forward destination designated line does not exist, the receipt mail server 2 terminates the process.

As discussed so far, according to the present E-mail management system, the validity of the forward destination address is checked by the E-mail forward function of the receipt mail server 2. Namely, the test mail is sent to the forward destination address and, if the valid reply mail to the test mail is sent back to the receipt mail server 2, the forward destination address becomes effective. Therefore, the processing by the receipt mail server 2 enables the setting of a wrong forward destination to be prevented.

Moreover, the receipt mail server 2 confirms, as the conditions for the validity, that the response to the test mail is given from the forward destination address, and besides that the response to the test mail is given from the normally used mail address. It is therefore possible to make the forward requester respond to the test mail by use of the E-mail address managed beforehand. Hence, an unjustified response to the test mail can be prevented.

Further, the Web server 1 in the first embodiment discussed above, if the forward destination address of which the forward setting is requested on the Web page falls within the predetermined range, e.g., the range covering the in-office addresses and the addresses of the affiliated companies, immediately makes the receipt mail server 2 register this forward destination address. On the other hand, the test mail is delivered to the off-office forward destination address. Therefore, the in-self-office forward destination addresses can be quickly registered. While on the other hand, the off-self-office forward destination addresses of the E-mails can be strictly checked.

Moreover, the receipt mail server 2 retains the forward destination address effective period in each forward destination designated line of the forward destination checklist 5. It is therefore feasible to prevent the E-mail from being forwarded to the forward destination address beyond the period.

Moreover, the forward effectiveness or ineffectiveness can be freely set within the period range described above.

Further, according to the first embodiment, the response step to the test mail is provided from the Web server 1 on the Intranet. Accordingly, an external third party posing as the party concerned can be prevented from responding to the test mail.

<Modified Example>

In the first embodiment, the test mail A is sent to the forward destination address, and the test mail B is sent to the normally used forward source mail address. The embodiment of the present invention is not, however, limited to the scheme and steps described above. For example, the test mail A is sent to the forward destination address, while the test mail B may not be sent to the normally used forward source mail address. Namely, the validity of the forward destination address may be checked by only the test mail addressed to the forward destination address.

According to the first embodiment, the Web server 1 providing the Web page on which the application for the forward destination address is received, sends the test mail to the forward destination address. Further, the Web server 1 sends the formatted text C for making the request for the permission of forwarding to the receipt mail server 2. The embodiment of the present invention is not, however, confined to the scheme and steps described above.

For instance, the Web server 1 may request other communication device to send the test mail. Moreover, the Web server 1 may send the formatted text C for making the request for the permission of forwarding to the receipt mail server 2, and may also request this receipt mail server 2 to send the test mail (in this case, the receipt mail server 2 corresponds to a communication device). At this time, communications between the Web server 1 and the receipt mail server 2 may be performed by the E-mails or by utilizing other file forward functions such as FTP (File Transfer Protocol), etc. and a file sharing function based on NFS (Network File System), etc.

In this case, the receipt mail server 2 and the transmission mail server 4 may be operated based on the same host. Further, the Web server 1 and the receipt mail server 2 may be operated based on the same host. In this case, the receipt mail server 2 may execute accepting the forward setting request, sending the test mail, confirming the response to the test mail, registering the forward destination address after confirming the response, and so forth.

Reversely, these processes such as accepting the forward setting request, sending the test mail, confirming the response to the test mail, registering the forward destination address after confirming the response and so on, may also be shared among different server devices. In this case, the communications among the servers may involve utilizing the aforementioned E-mails, FTP, NFS, or RPCs (Remote Procedure Calls) that are well known in, e.g., the UNIX system and DCOM (Distributed Component Object Model) provided as a Windows function which is defined as OS of the Microsoft Corp., U.S.A.

According to the first embodiment, the keyword 1 is fixedly set as the value of constant in the Web server 1 and the receipt server 2. As a substitute for this, however, the keyword 1 may be transferred to the receipt mail server 2 from the Web server 1. It may suffice for attaining this to have the keyword 1 contained in the formatted text C (FIG. 6) sent to the receipt mail server 2 from the Web server 1.

Second Embodiment

A second embodiment of the present invention will be discussed with reference to FIGS. 11 through 17. The first embodiment has exemplified the E-mail management system in which the Web page for setting the forward destination address is provided, and the user is made to set the forward destination address on the basis of the information on this Web page.

The second embodiment will exemplify an E-mail management system for setting the forward destination address by sending an E-mail to the receipt mail server 2 from the user terminal 3 without utilizing the Web server 1 described above. Other configurations and operations are the same as those in the first embodiment. Such being the case, the same components are marked with the same symbols as those in the first embodiment, and their explanations are omitted. Further, the drawings in FIGS. 1 through 10 will be referred to when the necessity may arise.

<System Architecture>

Figure 11:
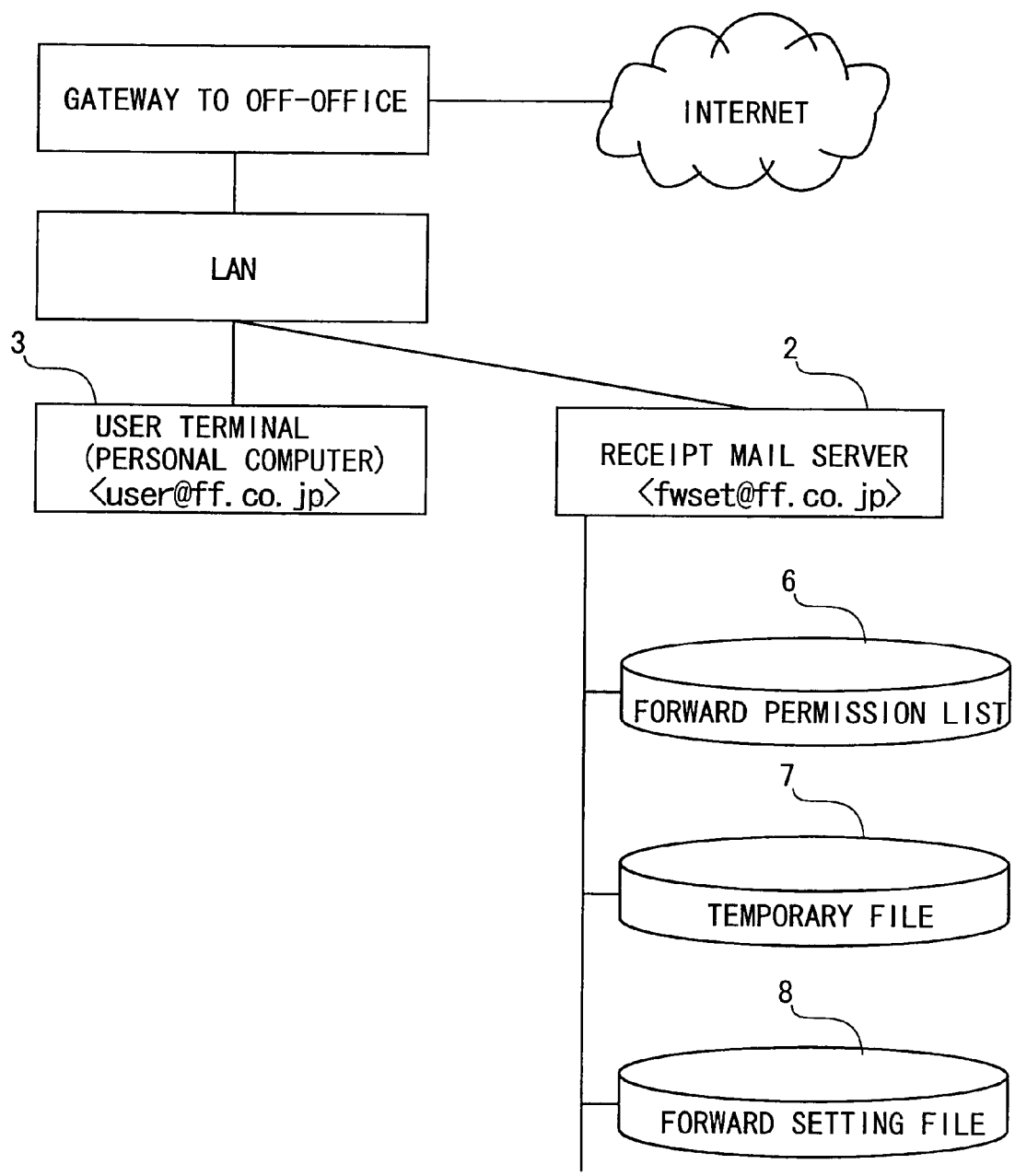
FIG. 11 is a diagram showing a system architecture of the E-mail management system in a second embodiment.

FIG. 11 is a diagram showing a system architecture of the E-mail management system in the second embodiment. This system includes the user terminal 3 utilized by the user and the receipt mail server 2. The user terminal 3 and the receipt mail server 2 are connected via the LAN to each other. Further, this system is connected to the Internet via a gateway to the outside.

In the second embodiment, the receipt mail server 2 has a forward permission list 6, a temporary file 7 and a forward setting file 8. In the receipt mail server 2, the forward permission list 6 is registered with one or more forward destination addresses permitted to receive the E-mails forwarded.

The forward setting file 8 is registered with a forward destination address to which the received E-mail is forwarded. The user can register the forward destination in the forward setting file 8 by sending an E-mail for making a request for a forward setting to an accept address (fwset@ff.co.jp) of the receipt mail server 2.

The temporary file 7 is buffered with a content of such an E-mail for making the forward setting request given from the user. When the forward destination of which the forward setting is requested by the user proves permitted in the forward permission list 6, this forward destination is transferred to the forward setting file 8 from the temporary file 7.

On the other hand, if the forward destination of which the forward setting is requested by the user is not registered in the forward permission list 6, the receipt mail server 2 sends the test mail to the forward destination in the same steps as those done by the Web server 1 in the first embodiment.

Then, in the same steps as in the case of the first embodiment, just when the response to the test mail is confirmed, the forward destination address is added to the forward permission list 6 and further registered in the forward setting file 8. The forward setting request is retained in the temporary file 7 till the response to the test mail is confirmed.

<Data Structure>

FIG. 12 shows an example of the E-mail delivered to the receipt mail server 2 from the user terminal 3 when making the forward setting request. The user desiring to forward the E-mail received sends the E-mail shown in FIG. 12 to the accept address (fwset@ff.co.jp in FIG. 12) of the receipt mail server 2.

In the E-mail in FIG. 12, a title "forward-set" represents that this E-mail is the forward setting request. Further, "set forward list" described in the first line of the text represents that the forward destination addresses are listed up in the lines under the first line. The embodiment of the present invention is not, however, limited to the aforementioned title and the text description itself.

Further, in the E-mail shown in FIG. 12, aaa@ff.co.jp, etc. is defined as the forward destination address. Moreover, Y user in the last line designates a registration of a forward source address itself in the forward destination.

FIG. 13 shows an example of the forward permission list 6. The forward permission list 6 is created for every user. A user name defined as a recipient of the E-mail to be forwarded is described in the first line of the forward permission list 6.

Further, in the forward permission list 6, a permitted forward destination address and a permission effective period are listed up subsequently to the description of the user name. For example, *@ff.co.jp is a designation that permits forwarding to all the in-office addresses. Namely, forwarding to all the addresses having the domain name "ff.co.jp" is permitted. Referring to FIG. 13, the period for the in-office address is set to an "indefinite period".

Referring again to FIG. 13, for instance, bbb@nif.com 20010630 implies that forwarding to the forward destination address bbb@nif.com is permitted till Jun. 30th, 2001.

FIG. 14 shows an example of the E-mail delivered to the user terminal 3 from the receipt mail server 2 when the forward destination address is registered in the forward setting file 8 upon an approval of the forward setting request. Note that if the forward setting request is not approved, the receipt mail server 2 may notify the user terminal 3 of the request's being unapproved. The CPU of the receipt mail server 2 executing such a process corresponds a notifying unit.

In this E-mail a title "forward-changed" represents that the forward setting request is approved, and the forward destination has been changed. A text thereof contains a registration completed date/time of the forward destination, a message indicating that the forward destination has been changed, and setting contents of the forward setting file 8 of the user concerned after the change.

FIG. 15 shows an example of an E-mail sent in order for the user to obtain the present setting contents of the forward setting file 8. When the user terminal 3 sends the E-mail shown in FIG. 15 to the receipt mail server 2, the receipt mail server 2 replies the setting contents of the forward setting file 8 to the user concerned.

In this E-mail, a title is "forward-get" that implies a reply request of the setting contents of the forward setting file 8. Further, "get-forward-list" in the text implies that this E-mail is a reply request of the setting contents of the forward setting file 8. Moreover, a target user is designated next to this "get-forward-list" line.

<Operation and Effect>

Figure 16:
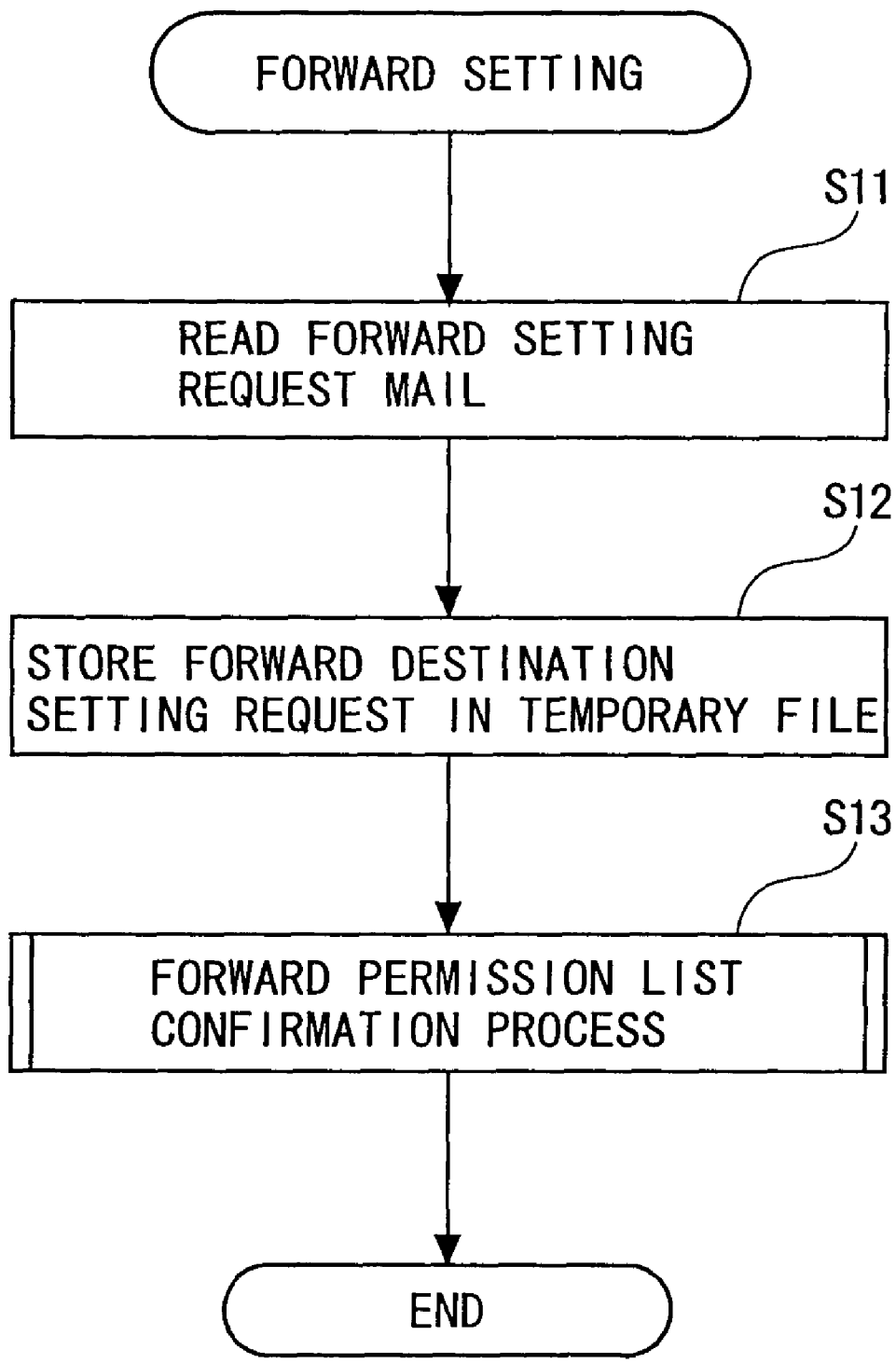
FIG. 16 is a flowchart showing a forward setting process executed by the receipt mail server 2.

FIG. 16 shows a flow chart of a forward setting process executed by the receipt mail server 2. This process is started up when receiving the E-mail addressed to the accept address (fwset@ff.co.jp in FIG. 11) of the receipt mail server 2. In this process, the receipt mail server 2, at first, reads the forward setting request E-mail (S11).

Next, the receipt mail server 2 stores contents of this E-mail in the temporary file 7 (S12). Subsequently, the receipt mail server 2 executes a forward permission list confirmation process (S13).

Figure 17:
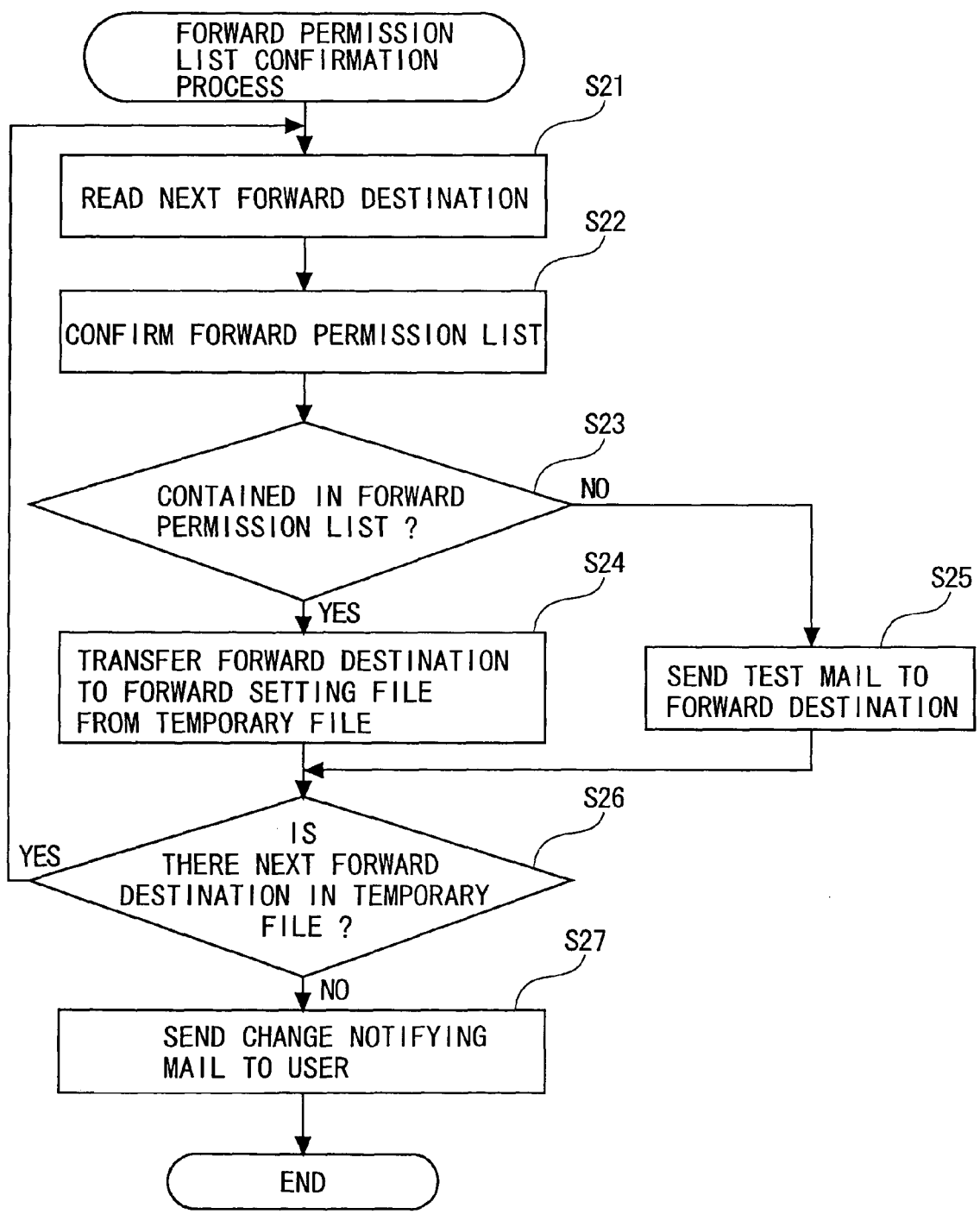
FIG. 17 is a flowchart showing details of a forward permission list confirmation process.

FIG. 17 shows details of the forward permission list confirmation process. In this process, the receipt mail server 2, to begin with, reads a next forward destination from the temporary file 7 (S21) Next, the receipt mail server 2 confirms the forward permission list 6 (S22). Then, the receipt mail server 2 judges whether or not a forward destination address thereof is contained in the forward permission list 6 (S23).

If the forward destination is contained in the forward permission list 6, the receipt mail server 2 transfers this forward destination to the forward setting file 8 from the temporary file 7 (S24). Thereafter, the receipt mail server 2 advances the control to a process in S26.

Whereas if the forward destination is not contained in the forward permission list 6, the receipt mail server 2 sends the test mail to this forward destination (S25). Upon a confirmation of a response to this test mail, the forward destination is registered in the forward permission list 6 and further set in the forward setting file 8. The step of confirming the response to the test mail is the same as in the first embodiment, and hence its explanation is omitted.

Next, the receipt mail server 2 judges whether or not a next forward destination exists in the temporary file 7 (S26). If the next forward destination is left in the temporary file 7, the receipt mail server 2 returns the control S21. Whereas if the next forward destination is not left in the temporary file 7, the receipt mail server 2 sends a change notifying mail to the user (S27). Thereafter, the CPU 2 terminates the process.

As discussed above, according to the second embodiment, unlike the first embodiment the forward setting can be managed only by sending and receiving the E-mail without utilizing the Web server 1.

<<Readable-by-Computer Recording Medium>>

The program executed in the Web server 1 or the receipt mail server 2 in the embodiments discussed above can be recorded on a readable-by-computer recording medium. Then, the computer reads and executes the program on this recording medium, thereby functioning as the Web server 1 or the receipt mail server 2 shown in the embodiments discussed above.

Herein, the readable-by-computer recording medium includes recording mediums capable of storing information such as data, programs, etc. electrically, magnetically, optically and mechanically or by chemical action, which can be all read by the computer. What is demountable out of the computer among those recording mediums maybe, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<<Data Communication Signal Embodied in Carrier Wave>>

Furthermore, the above program can be stored in the hard disk and the memory of the computer, and downloaded to other computers via communication media. In this case, the program is transmitted as data communication signals embodied in carrier waves via the communication media. Then, the computer downloaded with this program can be made to function as the Web server 1 or the receipt mail server 2 in the embodiments discussed above.

Herein, the communication media may be any one of cable communication mediums such as metallic cables including a coaxial cable and a twisted pair cable, optical communication cables, or wireless communication media such as satellite communications, ground wave wireless communications, wireless LANs, Bluetooth, etc.

Further, the carrier waves are electromagnetic waves for modulating the data communication signals, or the light. The carrier waves may, however, be DC signals. In this case, the data communication signal takes a base band waveform with no carrier wave. Accordingly, the data communication signal embodied in the carrier wave may be any one of a modulated broadband signal and an unmodulated base band signal (corresponding to a case of setting a DC signal having a voltage of 0 as a carrier wave).

INDUSTRIAL APPLICABILITY

The present invention can be applied to an industry of manufacturing and selling information devices, developing programs for the information devices, an industry of system integration including the information devices and an industry of providing services utilizing the information devices.

What is claimed is:

1. An E-mail management system for managing a forward destination of an E-mail, the E-mail management system including a processor, the processor programmed to execute:
    accepting a setting request of a forward destination address corresponding to a receipt address of an E-mail addressed to the receipt address and the E-mail being to be forwarded to the forward destination address;
    providing a user with information representing response steps for responding to the test E-mail according to a designation, where the user is within a predetermined range;
    executing a confirmation of a validity of the forward destination address to which the E-mail addressed to the receipt address is forwarded, by sending the test mail to the forward destination address and receiving the response to the test mail;
    wherein said confirmation includes confirming whether or not the response conforms with the designation;
    registering the forward destination address corresponding to the receipt address if the confirmation proved successful;
    forwarding a received E-mail addressed to the receipt address to the forward destination address when the forward destination address corresponding to the receipt address is registered;
    registering a forward destination address unconditionally in response to said setting request for setting the forward destination address that is within a predetermined range; and
    registering a forward destination address with respect to which the confirmation proved successful in response to said setting request for setting the forward destination address that is beyond the predetermined range.

2. The E-mail management system according to claim 1, the processor further programmed to execute: commanding a sending device to send a test mail to the forward destination address; and
    communicating with a receiving device to receive a response to the test mail, wherein said confirmation includes confirming the validity of the forward destination address by the response received by said receiving device.

3. The E-mail management system according to claim 1, the processor configured to communicate with a mail server which registers the forward destination address corresponding to the receipt address of the E-mail, and forwards a received E-mail addressed to this receipt address to the forward destination address,
    wherein said mail server is commanded to register the forward destination address if the confirmation proved successful.

4. The E-mail management system according to claim 3, the processor further programmed to execute: receiving a request for confirming the already-registered forward destination address from said mail server, and
    confirming the validity of this already-registered forward destination address.

5. The E-mail management system according to claim 1, wherein said confirmation includes confirming whether or not the response is transmitted from the receipt address.

6. The E-mail management system according to claim 1, wherein said confirmation includes sending test mails respectively to the receipt address and the forward destination address, and confirming responses to these two test mails.

7. The E-mail management system according to claim 1, the processor further programmed to execute notifying that a permission of forwarding to the forward destination address with respect to which the confirmation proved unsuccessful, can not be given.

8. An E-mail management system according to claim 1, the processor further programmed to execute:
    conforming a validity of the already-registered forward destination address after a predetermined period of time has elapsed since the registration thereof, and suspending the forwarding to the already-registered forward destination address till the confirmation proves successful after the elapse of the predetermined period of time.

9. The E-mail management system according to claim 1, wherein said accepting includes receiving the response in a predetermined format at a predetermined address.

10. An E-mail management system cooperating with a mail server which registers a forward destination address corresponding to a receipt address of an E-mail and forwards a received E-mail addressed to this receipt address to the forward destination address, said system comprising a processor programmed to execute:
    accepting a setting request of a forward destination address corresponding to a receipt address of an E-mail addressed to the receipt address and the E-mail being to be forwarded to the forward destination address;
    proving a user with information representing response steps for responding to the test E-mail according to a designation, where the user is within a predetermined range;
    issuing to a mail server, a command of confirming a validity of the forward destination address to which the E-mail addressed to the receipt address is forwarded; and
    wherein the confirming includes sending the test mail and making a validity of the forward destination address confirmed by the response to the test mail, to said mail server from the receipt address, by checking whether the response conforms with the designation;
    wherein in said confirming, a sending device is commanded to send a test mail to the forward destination address, and the validity of the forward destination address is confirmed by a response to the test mail, to said mail server from the receipt address,
    the processor further programmed to execute:
    receiving a request for confirming an already-registered forward destination address from said mail server, and
    issuing a command of confirming the validity of this already-registered forward destination address.

11. The E-mail management system according to claim 10, wherein said sending device is said mail server.

12. The E-mail management system according to claim 10, wherein in said confirming, sending test mails respectively to the receipt address and the forward destination address is commanded, and making said mail server confirm the validity of responses to these two test mails.

13. The E-mail management system according to claim 10, wherein said accepting includes receiving the response in a predetermined format at a predetermined address.

14. An E-mail forward destination management method of managing a forward destination of an E-mail, comprising:
    accepting a setting request of a forward destination address corresponding to a receipt address of an E-mail addressed to the receipt address and the E-mail being to be forwarded to the forward destination address;

providing a user with information representing response steps for responding to the test E-mail according designation, where the user is within a predetermined range;

executing, using a processor, a confirmation of a validity of the forward destination address to which the E-mail addressed to the receipt address is forwarded, by sending the test mail to the forward destination address and receiving the response to the test mail;

wherein said confirmation includes confirming whether or not the response conforms with the designation;

registering the forward destination address corresponding to the receipt address when the confirmation proved successful;

forwarding a received E-mail addressed to the receipt address to the forward destination address when the forward destination address corresponding to the receipt address is registered;

registering a forward destination address unconditionally in response to said setting request for setting the forward destination address that is within a predetermined range, and registering a forward destination address with respect to which the confirmation proved successful in response to said setting request for setting the forward destination address that is beyond the predetermined range.

15. The E-mail forward destination management method according to claim 14, further comprising:

commanding a sending device to send a test mail to the forward destination address; and communicating with a receiving device to receive a response to the test mail, wherein said confirmation includes confirming the validity of the forward destination address by the response received by said receiving device.

16. The E-mail forward destination management method according to claim 14, further comprising communicating with a mail server which registers the forward destination address corresponding to the receipt address of the Email, and forwards a received E-mail addressed to this receipt address to the forward destination address, wherein said mail server is commanded to register the forward destination address if the confirmation proved successful.

17. The E-mail forward destination management method according to claim 16, further comprising:

receiving a request for confirming the already-registered forward destination address; and confirming the validity of this already-registered forward destination address.

18. The E-mail forward destination management method according to claim 14, wherein said confirmation includes confirming whether or not the response is transmitted from the receipt address.

19. The E-mail forward destination management method according to claim 14, wherein said confirmation includes sending test mails respectively to the receipt address and the forward destination address and confirming responses to these two test mails.

20. The E-mail forward destination management method according to claim 14, further comprising notifying that a permission of forwarding to the forward destination address with respect to which the confirmation proved unsuccessful, can not be given.

21. The E-mail forward destination management method according to claim 14, further comprising executing a confirmation of a validity of the already-registered forward destination address after a predetermined period of time has elapsed since the registration thereof, wherein said forwarding to the already-registered forward destination address is suspended till the confirmation proves successful after the elapse of the predetermined period of time.

22. The E-mail forward destination management method according to claim 14, wherein said accepting includes receiving the response in a predetermined format at a predetermined address.

23. An E-mail forward destination management method of managing a forward destination of an E-mail in cooperation with a mail server which registers a forward destination address corresponding to a receipt address of the E-mail and forwards a received E-mail addressed to this receipt address to the forward destination address, said method comprising:

accepting a setting request of a forward destination address corresponding to a receipt address of an E-mail addressed to the receipt address and the E-mail being to be forwarded to the forward destination address;

providing a user with information representing response steps for responding to the test E-mail according to a designation, where the user is within a predetermined range;

issuing to a mail server, using a processor, a command of confirming a validity of the forward destination address to which the E-mail addressed to the receipt address is forwarded; and sending the test mail to the forward destination;

wherein a validity of the forward destination address is confirmed by the response to the test mail, to said mail server from the receipt address, by checking whether the response conforms with the designation;

wherein in said confirming, a sending device is commanded to send a test mail to the forward destination address, and the validity of the forward destination address is confirmed by a response to the test mail, to said mail server from the receipt address, further comprising:

receiving a request for confirming an already-registered forward destination address from said mail server; and issuing a command of confirming the validity of this already-registered forward destination address.

24. The E-mail forward destination management method according to claim 23, wherein said sending device is said mail server.

25. The E-mail forward destination management method according to claim 23, wherein in said confirming, sending test mails respectively to the receipt address and the forward destination address is commanded, and making said mail server confirm the validity of responses to these two test mails.

26. The E-mail forward destination management method according to claim 23, further comprising disclosing a step of the response to a test mail, to a user who is within a predetermined range.

27. The E-mail forward destination management method according to claim 23, wherein said accepting includes receiving the response in a predetermined format at a predetermined address.

28. A non-transitory recording medium readable-by-computer tangibly embodying a program of computer-readable instructions executable by a-processor to perform operations to manage a forward destination of an E-mail addressed-to the receipt address and the E-mail being to be forwarded to the forward destination address, said operations comprising:

accepting a setting request of a forward destination address corresponding to a receipt address of an E-mail;

providing a user with information representing response steps for responding to the test E-mail according to a designation, where the user is within a predetermined range;

executing a confirmation of a validity of the forward destination address to which the E-mail addressed to the receipt address is forwarded, by sending the test mail to the forward destination address;

receiving the response to the test mail, wherein said confirmation includes confirming whether or not the response conforms with the designation;

registering the forward destination address corresponding to the receipt address when the confirmation proved successful;

forwarding a received E-mail addressed to the receipt address to the forward destination address when the forward destination address corresponding to the receipt address is registered;

registering a forward destination address unconditionally in response to said setting request for setting the forward destination address that is within a predetermined range; and registering a forward destination address with respect to which the confirmation proved successful in response to said setting request for setting the forward destination address that is beyond the predetermined range.

29. The non-transitory recording medium readable-by-computer of claim 28, wherein the operations further include:
commanding a sending device to send a test mail to the forward destination address, and communicating with a receiving device to receive a response to the test mail,
wherein said confirmation includes confirming the validity of the forward destination address by the response received by said receiving device.

30. The non-transitory recording medium readable-by-computer of claim 28, wherein the operations further include commanding a mail server which registers the forward destination address corresponding to the receipt address of the E-mail, and forwards a received E-mail addressed to this receipt address to the forward destination address,
wherein said mail server is commanded to register the forward destination address if the confirmation proved successful.

31. The non-transitory recording medium readable-by-computer of claim 30, wherein the operations further include:
receiving a request for confirming the already-registered forward destination address; and
confirming the validity of this already-registered forward destination address.

32. The non-transitory recording medium readable-by-computer of claim 28, wherein said confirmation includes confirming whether or not the response is transmitted from the receipt address.

33. The non-transitory recording medium readable-by-computer of claim 28, wherein said confirmation includes sending test mails respectively to the receipt address and the forward destination address and confirming responses to these two test mails.

34. The non-transitory recording medium readable-by-computer of claim 28, wherein the operations further include notifying that a permission of forwarding to the forward destination address with respect to which the confirmation proved unsuccessful, can not be given.

35. The non-transitory recording medium readable-by-computer of claim 28, wherein the operations further include executing a confirmation of a validity of the already-registered forward destination address after a predetermined period of time has elapsed since the registration thereof,
wherein said forwarding to the already-registered forward destination address is suspended till the confirmation proves successful after the elapse of the predetermined period of time.

36. The non-transitory recording medium readable-by-computer of claim 28, wherein said accepting includes receiving the response in a predetermined format at a predetermined address.

37. A non-transitory recording medium readable-by-computer tangibly embodying a program of computer-readable instructions executable by a-processor to perform operations to manage a forward destination of an E-mail in-cooperation with a mail server which registers a forward destination address-corresponding to a receipt address of the E-mail and forwards a received E-mail-addressed to this receipt address to the forward destination address, said operations comprising:
accepting a setting request of a forward destination address corresponding to a receipt address of an E-mail addressed to the receipt address and the E-mail being to be forwarded to the forward destination address;
providing a user with information representing response steps for responding to the test E-mail according to a designation, where the user is within a predetermined range; and
issuing to a mail server, a command of confirming a validity of the forward destination address to which the E-mail addressed to the receipt address is forwarded;
sending the test mail to the forward destination;
wherein a validity of the forward destination address is confirmed by the response to the test mail, to said mail server from the receipt address, by checking whether the response conforms with the designation;
wherein in said confirming, a sending device is commanded to send a test mail to the forward destination address, and
the validity of the forward destination address is confirmed by a response to the test mail, to said mail server from the receipt address, further comprising:
receiving a request for confirming an already-registered forward destination address from said mail server; and
issuing a command of confirming the validity of this already-registered forward destination address.

38. The non-transitory recording medium readable-by-computer of claim 37, wherein said sending device is said mail server.

39. The non-transitory recording medium readable-by-computer of claim 37, wherein in said confirming, sending test mails respectively to the receipt address and the forward destination address is commanded, and making said mail server confirm the validity of responses to these two test mails.

40. The non-transitory recording medium readable-by-computer of claim 37, further comprising disclosing a step of the response to a test mail, to a user who is within a predetermined range.

41. The non-transitory recording medium readable-by-computer of claim 37, wherein said accepting includes receiving the response in a predetermined format at a predetermined address.

* * * * *

UNITED STATES PATENT AND TRADEMARK OFFICE
CERTIFICATE OF CORRECTION

PATENT NO.         : 7,962,554 B2
APPLICATION NO.    : 10/656194
DATED              : June 14, 2011
INVENTOR(S)        : Hisayasu Nakao It is certified that error appears in the above-identified patent and that said Letters Patent is hereby corrected as shown below:

Column 19, Line 2, In Claim 14, after "according" insert --to a--.

Column 19, Line 39, In Claim 16, delete "Email" and insert --E-mail--, therefor.

Column 20, Line 64, In Claim 28, delete "a-processor" and insert --a processor--, therefor.

Column 20, Line 65, In Claim 28, delete "addressed-to" and insert --addressed to--, therefor.

Column 21, Line 21-28, In Claim 28, delete "registering a forward destination address unconditionally in response to said setting request for setting the forward destination address that is within a predetermined range; and registering a forward destination address with respect to which the confirmation proved successful in response to said setting request for setting the forward destination address that is beyond the predetermined range." and
insert --registering a forward destination address unconditionally in response to said setting request for setting the forward destination address that is within a predetermined range; and
    registering a forward destination address with respect to which the confirmation proved successful in response to said setting request for setting the forward destination address that is beyond the predetermined range--, therefor.

Column 22, Line 15 (Approx.), In Claim 37, delete "a-processor" and insert --a processor--, therefor.

Signed and Sealed this
Third Day of April, 2012

David J. Kappos
*Director of the United States Patent and Trademark Office*